United States Patent
Peng et al.

(10) Patent No.: US 10,581,664 B1
(45) Date of Patent: Mar. 3, 2020

(54) PREDICTING SUBSCRIBER EXPERIENCE BASED ON QOE

(71) Applicant: SPIRENT COMMUNICATIONS, INC., San Jose, CA (US)

(72) Inventors: Peter Peng, Spring Lake, NJ (US); Marius Adamut, Hazlet, NJ (US); Meenal Agarwal, Marlboro, NJ (US); Brion Feinberg, Morganville, NJ (US); Ovidiu Reghis, Marlboro, NJ (US); Thomas Russo, Maplewood, NJ (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

(21) Appl. No.: 16/137,442

(22) Filed: Sep. 20, 2018

(51) Int. Cl.
*H04L 12/24* (2006.01)
*H04W 28/02* (2009.01)
*H04W 24/08* (2009.01)
*H04M 17/00* (2006.01)
(Continued)

(52) U.S. Cl.
CPC ........ *H04L 41/0622* (2013.01); *H04L 41/147* (2013.01); *H04L 41/5009* (2013.01); *H04M 15/842* (2013.01); *H04M 15/856* (2013.01); *H04M 17/35* (2013.01); *H04W 24/08* (2013.01);
(Continued)

(58) Field of Classification Search
USPC ........................................................ 455/405
See application file for complete search history.

(56) References Cited

U.S. PATENT DOCUMENTS

| | | | |
|---|---|---|---|
| 7,689,455 B2 * | 3/2010 | Fligler | G06Q 30/02 705/7.38 |
| 9,424,121 B2 * | 8/2016 | Kushnir | G06F 11/079 |
| 9,432,865 B1 * | 8/2016 | Jadunandan | H04W 24/08 |

(Continued)

OTHER PUBLICATIONS

Neil et al., "KATS: Kernel-smoothed Adaptive Thresholds for Network Anomaly Detection", Los Alamos National Laboratory Associate Directorate for Theory, Simulation, and Computation (ADTSC) LA-UR 10-01992, Lambert, D. and C. Liu, J Am Stat Assoc 101, 78 (2006), pp. 82-83.

(Continued)

*Primary Examiner* — Julio R Perez
(74) *Attorney, Agent, or Firm* — Haynes Beffel & Wolfeld, LLP

(57) ABSTRACT

The disclosed technology teaches alerting a network operator to deteriorated wireless network conditions with granularity and reduced false alerts, including receiving tracked performance indicators (KPIs) for multiple components of voice, data and messaging and accessing a mapping for combining the performance indicators into quality sub-indicators for individual users and into key quality indicators (KQI) for the individual users. This includes smoothing the current KQI measures of performance over time to reduce the impact of brief transitory events, accessing a weekly profile of KQIs, and comparing KQIs for a current time window to past KQIs for a corresponding time window for the individual users operating mobile devices in part of the cellular network that is a focus of interest. Based on the comparing, the disclosed technology includes generating alerts that report out-of-range current KQIs within the focus of interest that are persistently out-of-range for longer than a configurable time.

18 Claims, 18 Drawing Sheets
(14 of 18 Drawing Sheet(s) Filed in Color)

(51) Int. Cl.
*H04M 15/00* (2006.01)
*G06N 5/04* (2006.01)
(52) U.S. Cl.
CPC ........ *H04W 28/0268* (2013.01); *G06N 5/047* (2013.01)

(56) References Cited

U.S. PATENT DOCUMENTS

| | | | | |
|---|---|---|---|---|
| 9,485,679 | B2* | 11/2016 | Kreher | H04W 24/04 |
| 2010/0027432 | A1* | 2/2010 | Gopalan | H04L 41/142 |
| | | | | 370/252 |
| 2013/0198767 | A1* | 8/2013 | Wang | H04L 65/80 |
| | | | | 725/14 |
| 2015/0271827 | A1* | 9/2015 | Hamalainen | H04W 24/08 |
| | | | | 455/452.2 |

OTHER PUBLICATIONS

Spirent White Paper "Measuring Subscriber Quality of Experience (QoE)", Jul. 2014, pp. 1-6.

Lambert et al., "Adaptive Thresholds: Monitoring Streams of Network Counts", Article in Journal of the American Statistical Association, Mar. 2006, vol. 101, No. 473, Applications and Case Studies, DOI: 10.2307/30047442, Source: RePEc, pp. 78-88.

Spirent White Paper, "Transforming for NFV: VisionWorks for Lifecycle Service Assurance", pp. 1-14, 2017.

\* cited by examiner

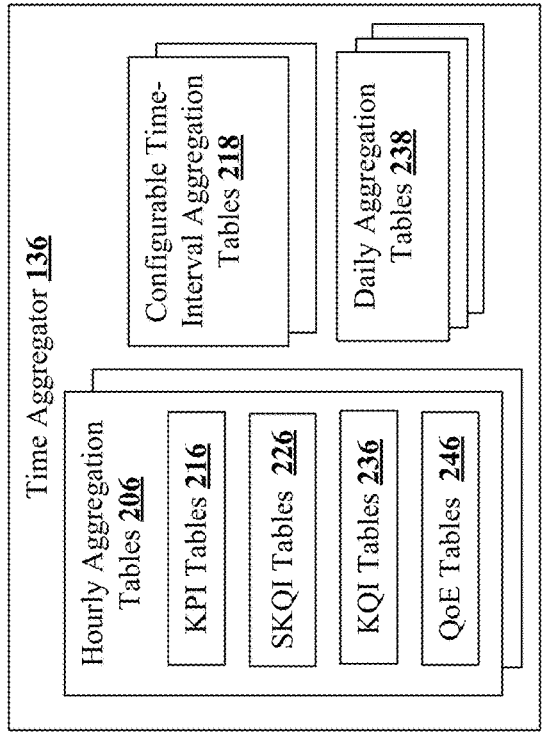
FIG. 2A
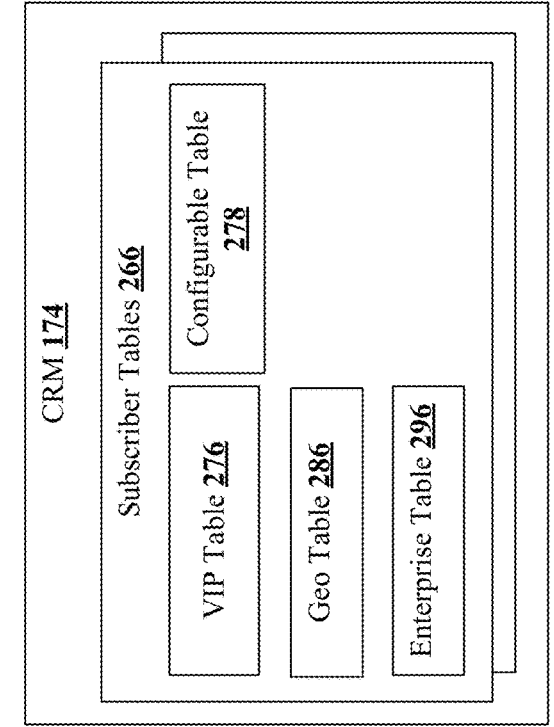
FIG. 2B
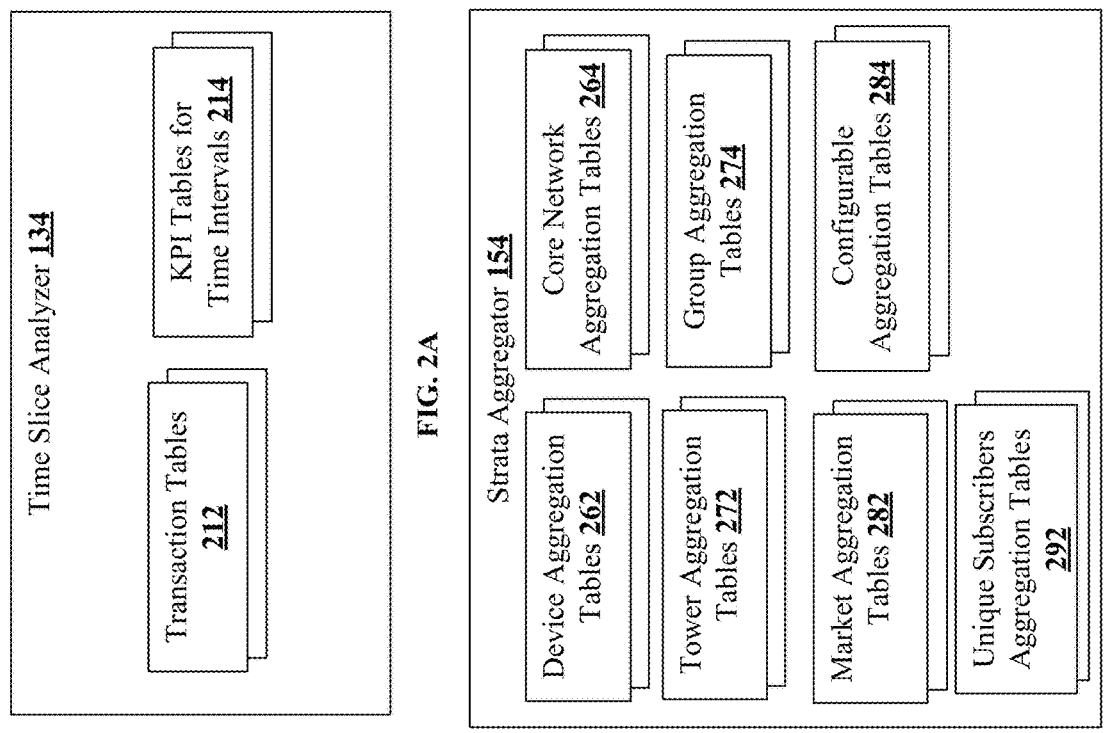
FIG. 2C
FIG. 2D

| Category | KQI | Sub-KQI (SKQI) | Failures | Total | Failure % | Threshold | Score | Weight | Weighted Average |
|---|---|---|---|---|---|---|---|---|---|
| Overall QoE | Voice KQI | Voice Call Ineffective Attempt Rate | 121 | 150 | 80.7% | 30% | 1.0 | 133 | 1.4 |
| | | Voice Call Drop Rate | 0 | 29 | 0.0% | 15% | 5.0 | 10 | |
| | | Voice Handover Failure Rate | 0 | 0 | 0.0% | 15% | 5.0 | 0 | |
| | | Voice Calls Long Setup Time Rate | 1 | 29 | 3.4% | 30% | 4.5 | 5 | |
| | SMS KQI | Message failure rate | 0 | 5 | 0.0% | 30% | 5.0 | 20 | 5.0 |
| | Data KQI | Data session setup failure rate | 40 | 133 | 30.1% | 30% | 1.0 | 27 | 2.5 |
| | | Attach failure rate | 0 | 1 | 0.0% | 30% | 5.0 | 5 | |
| | | Authentication failure rate | 1 | 15 | 6.7% | 30% | 4.1 | 5 | |
| | | Radio Bearer Setup Failure Rate | 91 | 235 | 38.7% | 30% | 1.0 | 20 | |
| | | Handover Failure Rate | 0 | 477 | 0.0% | 15% | 5.0 | 10 | |
| | | Radio Bearer Drop Rate | 1 | 144 | 0.7% | 15% | 4.8 | 11 | |
| | | | | | | | Overall QoE | | 2.1 |

PREDICTING SUBSCRIBER EXPERIENCE BASED ON QOE

FIELD OF THE TECHNOLOGY DISCLOSED

The technology disclosed relates generally to predicting subscriber experience based on a cumulative quality of experience derived from usage and performance data over time. More specifically, the technology discloses a network-based tool for monitoring the experience of individual subscribers in a wireless communications network.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Network service providers need to care about the experience of their subscribers, even if the aggregate performance of individual devices or whole networks is at a very high level. In the world of service providers, subscribers often do not care how much bandwidth the big routers at the core of the Internet can deliver. They care about getting the bandwidth and the experiences for which they are paying. Some of those subscribers may be paying extra for a high quality of service, ensuring a certain level of bandwidth, lower latency, etc. This will be reflected in the differentiated services code points (DSCP), virtual local area network (VLAN) IDs, and/or VLAN priority bits used to identify packets, or qualities of service, which might be treated differently from other packets—similar in concept to business class airline passengers who pay more, and therefore expect more from their experience. Some of those subscribers are paying for more bandwidth so they can share their personal experiences in real-time—at a large outdoor concert in one example, via live streaming, utilizing video and audio traffic.

Measuring subscriber experience scores allows network service providers to improve their ability to predict which subscribers are likely to churn so they can take retention actions. The churn rate, also known as the rate of attrition, is the percentage of subscribers to a service who discontinue their subscriptions to that service within a given time period. For a company to expand its clientele, its growth rate, as measured by the number of new customers, must exceed its churn rate.

Existing systems for analyzing customer experience utilize aggregate quality of experience (QoE) scores and utilize fixed thresholds, considering the subscriber experience at a single time interval, for deciding when the communication services are adequate.

Network systems are very prone to time-variant performance. Because the user base may utilize the system more at certain times and not at others, the load on the system and the resulting quality of service for the end users fluctuates with time. This creates problems with traditional thresholding and alert calculations. One approach for analyzing customer experience is holding a constant threshold level for all timer periods. This approach fails to perform as an adequate alert measure because it is unable to find a balance between false positive and false negative results. Either, the constant threshold level is set too sensitively and alerts with normal cyclic changes or the sensitivity is set too low and the system rarely alerts. The other alternative is dynamic thresholding, in which the thresholds can be varied for given time periods. This approach comes with a requirement for significant manual input of the individual thresholds.

An opportunity arises for alerting a network operator to deteriorated wireless network conditions with granularity and reduced false alerts, applying intelligent thresholding to identify network and device measurements that deviate significantly from behavior on an average day. Intelligent thresholding is usable to objectively evaluate voice, data and short message service (SMS) communication services over multiple time intervals to analyze subscriber experience for an individual, utilizing quality of service indicators to show the network performance history for the individual subscriber. Objective evaluation leads to potentially enhancing subscriber retention rates and increased service quality can affect the amount that subscribers use pay-as-you-go services such as prepaid cell services, thereby directly impacting revenue.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches a method for alerting a network operator to deteriorated wireless network conditions with granularity and reduced false alerts, including receiving tracked performance indicators for multiple components of at least voice, data and messaging over a cellular network, accessing a mapping of the performance indicators to key quality indicators, and combining the performance indicators, according to the mapping, into quality sub-indicators for individual users and into key quality indicators (abbreviated KQI) for the individual users. The disclosed method also includes smoothing the current key quality indicators measures of performance over time to reduce impact of brief transitory events, accessing a weekly KQI profile of key quality indicators, and comparing KQIs for a current time window to past KQIs for a corresponding time window in the weekly KQI profile for the individual users operating mobile devices in part of the cellular network that is a focus of interest. Based on the comparing, the technology teaches generating alerts that report out-of-range current KQIs within the focus of interest that are persistently out-of-range longer than a configurable time.

Other aspects and advantages of the technology disclosed can be seen on review of the drawings, the detailed description and the claims, which follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 2A shows a time slice analyzer which processes collected records into transaction tables and key performance indicator (KPI) tables for time intervals.

FIG. 2B shows a time aggregator that combines the staging KPI tables for time intervals at the end of each hour and stores hourly aggregation tables.

FIG. 2C shows an example strata aggregator that collects data into aggregation tables, including device aggregation tables, core network aggregation tables, tower aggregation tables, group aggregation tables and market aggregation tables.

FIG. 2D shows an example CRM which includes subscriber tables with VIP table, geo table of geographically aggregated data, enterprise table which includes enterprise subscribers to the network and configurable table that stores additional aggregated data configurable by an operator.

FIG. 9 shows KQI and weight calculations applied to an example scenario in which data results in a calculated overall low QoE.

FIG. 11 shows a snippet of a KPI data table for time intervals, with a snapshot of part of the data for 15 minute segments, for an individual subscriber.

DETAILED DESCRIPTION

Figure 1:
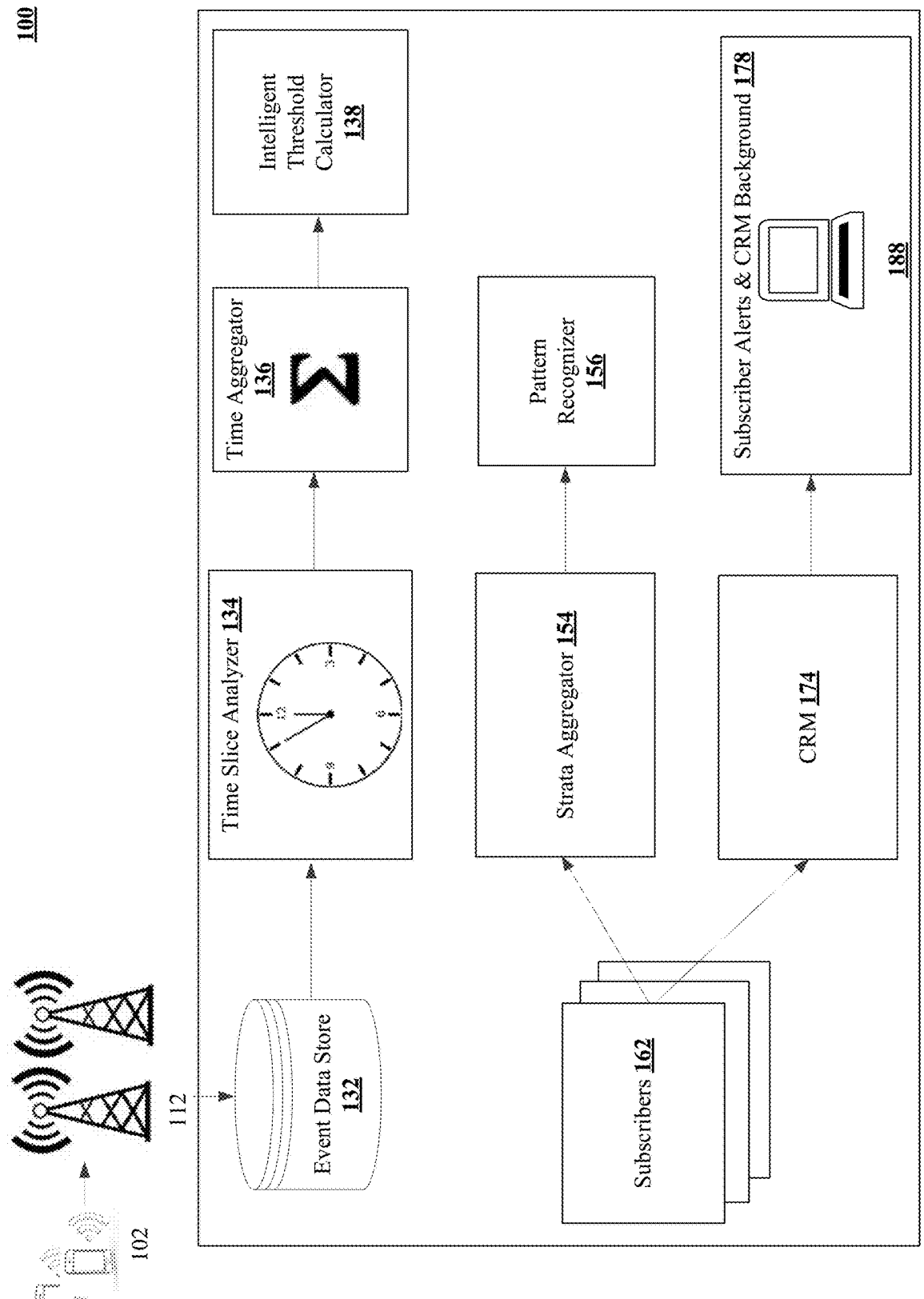
FIG. 1 depicts an exemplary system for alerting a network operator to deteriorated wireless network conditions with granularity and reduced false alerts, according to one implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Network performance measurement streams include complex long-term trends, rough cyclical patterns and outliers. Quality of experience (QoE) models need to be designed with an eye toward continuous improvement using objective feedback measures like churn for individual subscribers, and performance changes need to be measured to identify degraded network performance as quickly as possible. Also, subscribers talk to each other and bad experiences of one subscriber can lead to other subscribers not buying services due to quality concerns. Lower quality service can also reduce how much the subscriber uses the service, and for pay-as-you-go services such as prepaid cell services, a reduction in use directly impacts revenue.

Intelligent thresholding can be used to solve the problem of monitoring time-variant performance of networks by creating a threshold that is appropriate for each individual situation. Intelligent thresholding works under the assumption that the system is loaded in a cyclic pattern, an assumption that tends to hold true because end users tend to follow cyclic cycles. This provides daily and weekly patterns in the data that can be used to predict what future values should be. Intelligent thresholding takes advantage of these patterns, by comparing the incoming data to these predictions. Any variation from these predictions could indicate an error or problem within the network, so alerts can be sent and the components involved can be inspected.

The disclosed technology is usable to implement a heuristic model to calculate the QoE for an individual subscriber, based on the performance of services used by that subscriber during a defined time interval or set of time intervals. The analytics component of the model supports subscriber-level QoE and impact analysis based on data models that incorporate both active test and passive subscriber and network data sources. The QoE scores can be used to analyze trends in QoE over time, or to compare QoE between different subscriber populations. The QoE scores can also be used to identify abnormal network performance, by detecting unexpected decreases in QoE values using intelligent thresholding, which includes the ability to initiate a self-learning threshold that will adapt to temporal patterns in the network data.

The disclosed technology enhances the application of the QoE model by making available the volume of impacted intervals over a time period for use as a predictor of individual subscriber experience as well as subscribers' experiences for cohorts of thousands to millions. A higher count of impacted intervals represents a more significant unsatisfactory experience, and a lower count of impacted intervals may only represent an insignificant or un-noticed glitch in the overall experience. Prediction of subscriber experience based on the cumulative QoE model derived from the composite usage and performance data can be utilized to determine actions to ameliorate the impact of churn.

For customer care, the QoE measurements are useful in one example in which a subscriber-specific module shows the history for an individual. The measurements are also useful for reviewing an entire subscriber population relative to a mean opinion score (MOS) threshold, looking for all subscribers who have unusual scores, to determine when there is an issue. In one case, when a network problem occurs on weekdays at rush hour, network operators can identify a solution for the bottleneck identified. Also, in some use cases, analytics software supports user-defined configuration of reports and dashboards to address specific decision-making and visibility needs for individual subscribers.

An architecture that includes intelligent thresholding for monitoring the QoE for individual subscribers, based on the performance of services used by that subscriber during specific time intervals is described next.

FIG. 1 shows example architecture 100 for alerting a network operator to deteriorated wireless network conditions with granularity and reduced false alerts. Architecture 100 includes multiple devices 102 that send and receive data, voice, SMS and voice over IP (VoIP) via towers 112. Architecture 100 also includes event data store 132 in which the raw records of subscriber data are collected and stored for the multiple subscribers, and time slice analyzer 134 which processes the collected records for storage into a set of tables, described relative to FIG. 2A infra. Architecture 100 further includes time aggregator 136 for aggregating data records from multiple tables into time-based aggregates described relative to FIG. 2B infra and intelligent threshold calculator 138 that initiates a self-learning threshold that adapts temporal patterns in the network data for applying intelligent thresholding to individual subscribers' data. Self-learning refers to learning cyclic trends in the data of interest.

Continuing with the description of FIG. 1, architecture 100 includes subscribers 162 which stores data profiles, per subscriber, of cell tower in use per time period, core network elements in use, payment plans and group affiliations. Additional subscriber-specific data can also be included in individual subscriber data profiles. Architecture 100 also includes strata aggregator 154 that collects data into aggregation tables, described relative to FIG. 2C infra. Pattern recognizer 156 identifies patterns in the data in the tables: for example, the numbers of subscribers who experience problems at a given time and the times that individual subscribers experience problems while using specific core network elements. In some cases, pattern recognizer 156 makes it possible to identify potential problems even before they are reported by the subscribers.

Further continuing with the description of FIG. 1, architecture 100 also includes customer relationship management (CRM) 174 and subscriber alerts and CRM background 178 with user interface (UI) 188 for managing interactions with current and potential subscribers, using the disclosed objective evaluation of subscriber service experience with data communication services in a diverse communications network to improve business relationships with subscribers. In one case, the focus is specifically on subscriber retention. FIG. 2D, described infra, includes CRM 174 details.

Raw data records are collected and processed to calculate KPIs which are stored by time slice analyzer 134 into a set of tables. FIG. 2A shows time slice analyzer 134 which processes the collected records into transaction tables 212 and KPI tables for time intervals 214. A set of KPI counters are incremented based on the characteristics of the raw records. That is, for a received file with data records, a count of the number of records in that file that meet the pre-determined criteria is stored in KPI tables for time intervals 214—and included in the 15-minute interval staging tables in one case. Time slice analyzer 134 can apply the same techniques to deliver KPI tables for different configurable time slices. In one use case, the time interval can be 5-minute segments and in another case the time interval can be 30-minute segments. In another use case, data can be sliced into different time intervals.

FIG. 2B shows time aggregator 136 that combines the staging KPI tables for time intervals 214 at the end of each hour and stores hourly aggregation tables 206 which include KPI tables 216 and sub-KPI (SKQI) tables 226. For an hourly KPI, the aggregation can be a simple addition of the four 15-minute interval staging tables for the hour, in one use case. Hourly key quality indicators (KQIs) and quality of experience (QoE) values are computed as part of the hourly process and stored in hourly KQI tables 236 and QoE tables 246. In one use case, many variations of data in hourly tables are aggregated and stored in configurable time-interval aggregation tables 218, with each table holding a unique combination of the data for later use. In one example, to determine the KPI hourly aggregation, two steps are used to calculate a KPI for "total number of successful calls that used cell site XXX in time slice YYYY". First, the KPI result is stored for each record in the received file. Because it is very likely that many different files have such records, to calculate the hourly aggregation, all of the stored "partial aggregates" for a particular KPI are added together and then stored in hourly KPI tables 216, to get the total count for that time interval. At the end of each day, time aggregator 136 further aggregates the data stored in hourly aggregation tables 206 into 24-hour time-based daily aggregates and then stores the data in daily aggregation tables 238. Additional configurable time-interval aggregation tables 218 can be populated for use cases that utilize other configurable time settings such as 12-hour segments or weekly time segments.

FIG. 2C shows strata aggregator 154 that collects data into aggregation tables, including device aggregation tables 262, core network aggregation tables 264, tower aggregation tables 272, group aggregation tables 274 and market aggregation tables 282. Additional aggregation options are configurable, and the results can be stored in configurable aggregation tables 284. In one example, aggregation can be by application, such as for a particular social media provider such as Facebook or Google search, and can include monitoring of ongoing activity. Example devices can be grouped by manufacturers, models and styles of the devices. Market aggregation tables 282 include data related to a particular subscriber's cellular device. In one example, the market can encapsulate a predefined geography, such as NJ. Market can also be aggregated based on a subscription type, such as pre-paid, post-paid and enterprise subscriptions, VIP employees or royal family members. Data for a subscriber can be reported in multiple market aggregations. Aggregations can be mapped both by previously defined strata and dynamically, based on the data that gets stored in time slice analyzer 134 and time aggregator 136.

FIG. 2D shows CRM 174 which includes subscriber tables 266 with VIP table 276, geo table 286 of geographically aggregated data, enterprise table 296 which includes enterprise subscribers to the network and configurable table 278 that stores additional aggregated data configurable by an operator.

Figure 2E:
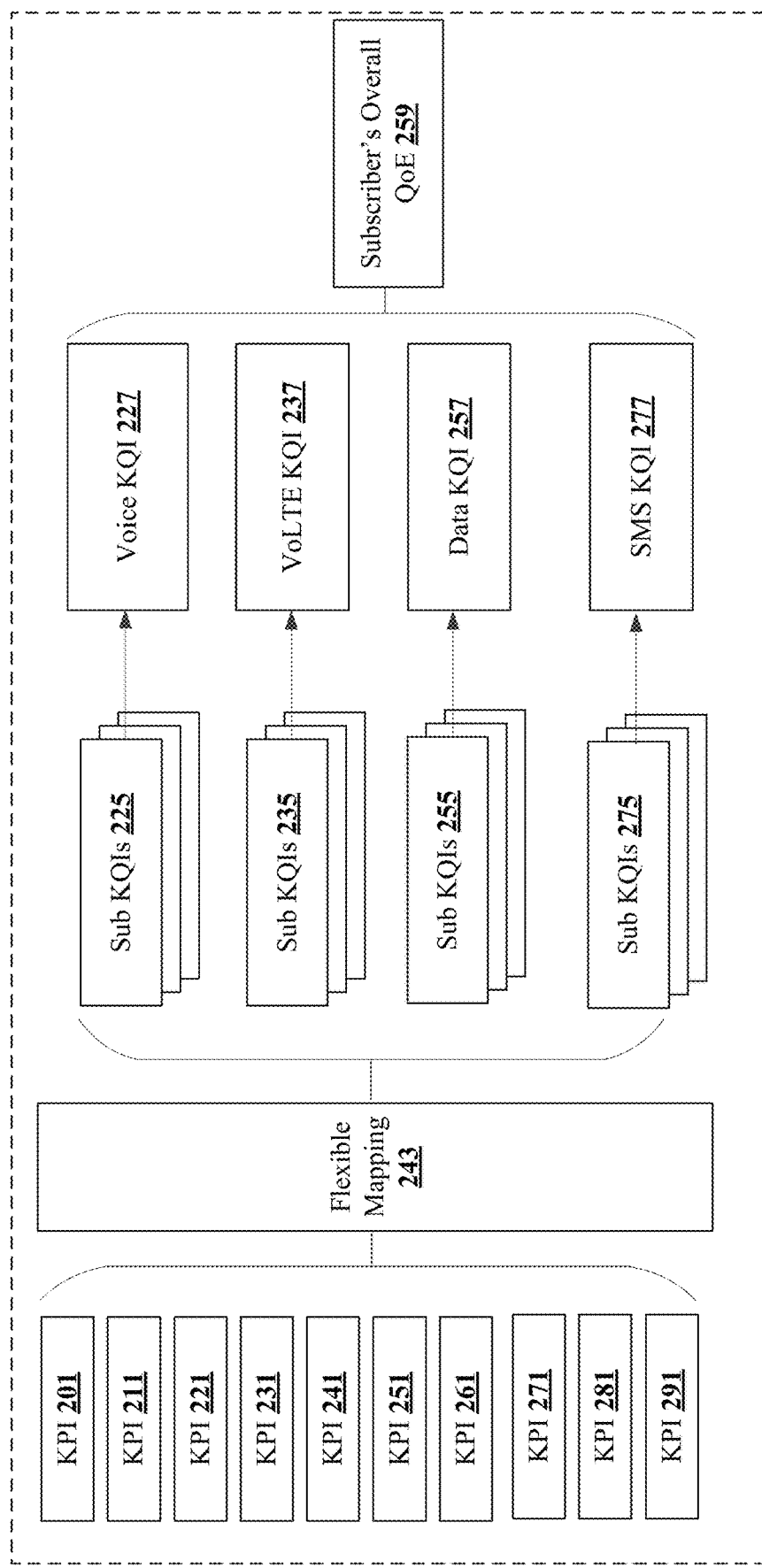
FIG. 2E graphically depicts the mapping of performance indicators referred to as KPIs, through intermediate quality sub-indicators referred to as SKQIs, to key quality indicators referred to as KQIs, to a subscriber's overall QoE.

FIG. 2E graphically depicts the mapping of performance indicators referred to as KPIs 201, 211, 221, 231, 241, 251, 261, 271, 281, 291 with flexible mapping 243 to intermediate quality sub-indicators referred to as sub KQIs 225, 235, 255, 275 to key quality indicators for voice KQI 227, VoLTE KQI 237, data KQI 257 and SMS KQI 277. The key quality indicators mas to a subscriber's overall QoE 259.

Figure 3:
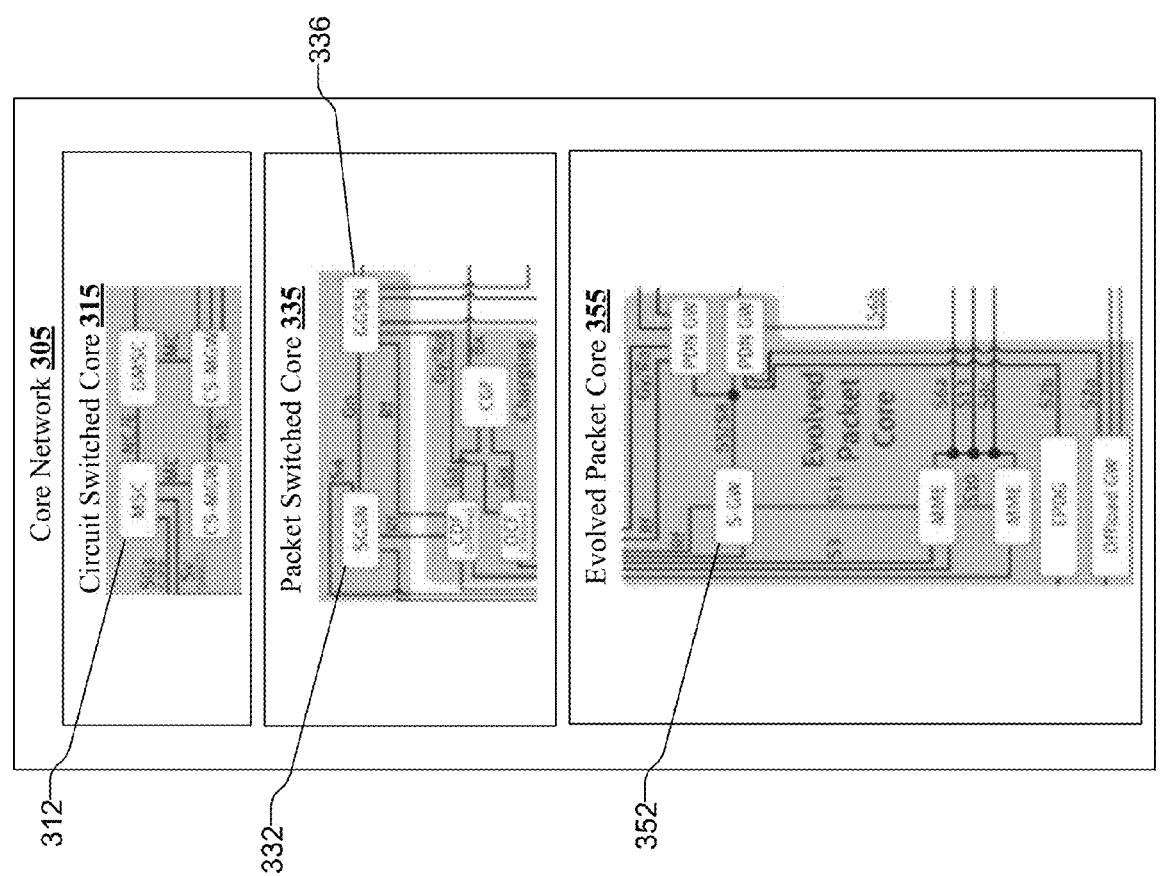
FIG. 3 shows an example representation of a core network that includes a circuit switched core, a packet switched core and an evolved packet core.

FIG. 3 shows an example representation of a core network 305 that includes a circuit switched core 315, a packet switched core 335 and an evolved packet core 355. Core networks include a variety of network elements. A sampling of the core elements is described next. Circuit switched core 315 includes mobile switching center (MSC) 312 that connects calls by routing the digital voice data packets from one network path to another. The MSC also provides the information that is needed to support mobile service subscribers, such as user registration and authentication information. Packet switched core 335 includes the serving gateway support node (SGSN) 332 which is a main component of the general packet radio service (GPRS) network, which handles all packet switched data within the network; that is, the mobility management and authentication of the users. The SGSN performs the same functions as the MSC for voice traffic. The gateway GPRS support node (GGSN) 336 is responsible for the interworking between the GPRS network and external packet switched networks, like the Internet and X.25 networks.

Continuing the description of core network elements, base station controller (BSC) subsystem handles traffic and signaling between a mobile phone and the network switching subsystem in a traditional cellular telephone network. The radio network controller (RNC) is a governing element in the universal mobile telecommunications system (UMTS) radio access network (UTRAN) and is responsible for controlling the NodeBs that are connected to it. Further describing core network elements, short message service center (SMSC) is the portion of a wireless network that handles SMS operations, such as routing, forwarding and storing incoming text messages on their way to desired endpoints. Wireless network operators connect SMSCs through SMS gateways. The mobility management entity (MME) is the signaling service between E-UTRAN and the evolved packet core 355 that fulfills the S1 Interface functions. The serving gateway (S-GW) 352 routes and forwards user data packets, while also acting as the mobility anchor for the user plane during inter-eNodeB handovers and as the anchor for mobility between LTE and other 3GPP technologies. The packet data network gateway (PGW) provides connectivity from the user equipment (UE) to external packet data networks by being the point of exit and entry of traffic for the UE. The home subscriber server (HSS) is a central database that contains user-related and subscription-related information. The functions of the HSS include functionalities such as mobility management, call and session establishment support, user authentication and access authorization. The proxy call session control function (P-CSCF) is an IP multimedia subsystem (IMS) element that identified as the mobile's first contact point within the IP multimedia core network (IM CN) subsystem. Functions of the P-CSCF include the forwarding of SIP messages received from the UE. These may be sent to the I-CSCF or S-CSCF, depending on the type of message and procedure being carried out. The P-CSCF is also responsible for the generation of call detail record (CDR). The access point name (APN) is the name of a gateway between a GSM, GPRS, 3G or 4G mobile network and another computer network, frequently the public Internet. The online charging system (OCS) is a system allowing a communications service provider to charge their customers, in real time, based on service usage. Additional core elements, not enumerated and described in the sampling listed herein, also contribute data to the core network aggregated and stored in core network aggregation tables 264.

QoE is an index, calculated based on the transaction records of a subscriber during a time interval, such as for a single hour, a single day or a week—using time aggregator 136. This index can be used as an indicator of the user's experience, and for comparative analyses of groups of users. In some use cases, the QoE index is usable for identifying abnormal activities within the network. The QoE does not reflect marketing activities, pricing, special promotions or ease of use. The QoE index reflects the computed scores and weights of a set of QoE contributors, considering the usage volume and the ratio of success versus failure transactions, which results in a set of scores and weights for each contributor.

Figure 4:
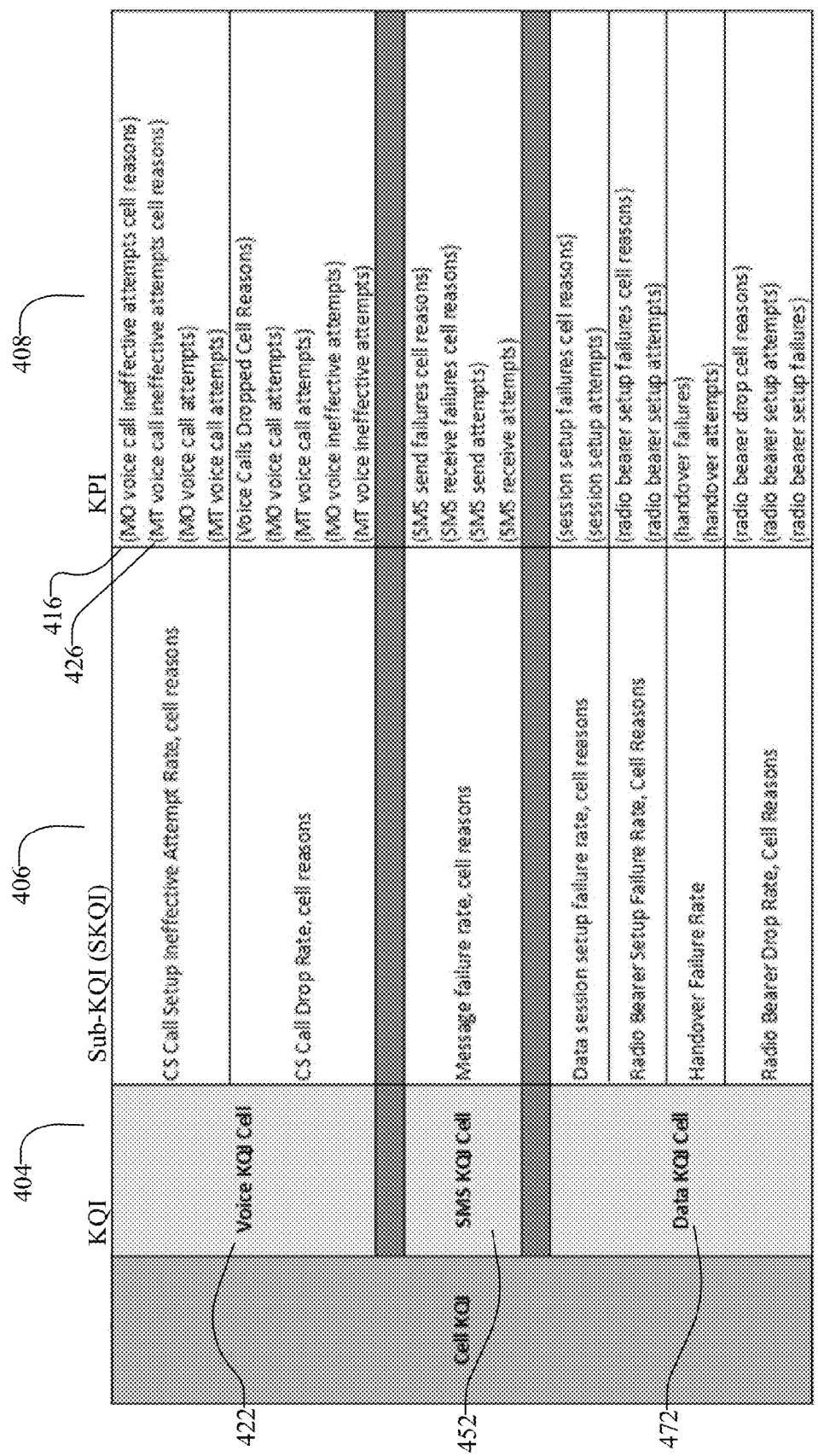
FIG. 4 lists example KPIs and sub-KQIs used to calculate cell key quality indicators (KQIs) for voice, SMS and data.

Calculation of the quality of experience (QoE) for an individual subscriber is based on the performance of voice, data, SMS and sometimes VoLTE services used by that subscriber during a defined time interval. For cell towers, FIG. 4 lists example cell phone KPIs 408 and sub-KQIs 406 used to calculate cell key quality indicators (KQIs) 404 for voice 422, SMS 452 and data 472. Note that voice-related KPIs include both mobile originated (MO) 416 and mobile terminated (MT) 426 voice call ineffective attempts.

Figure 5:
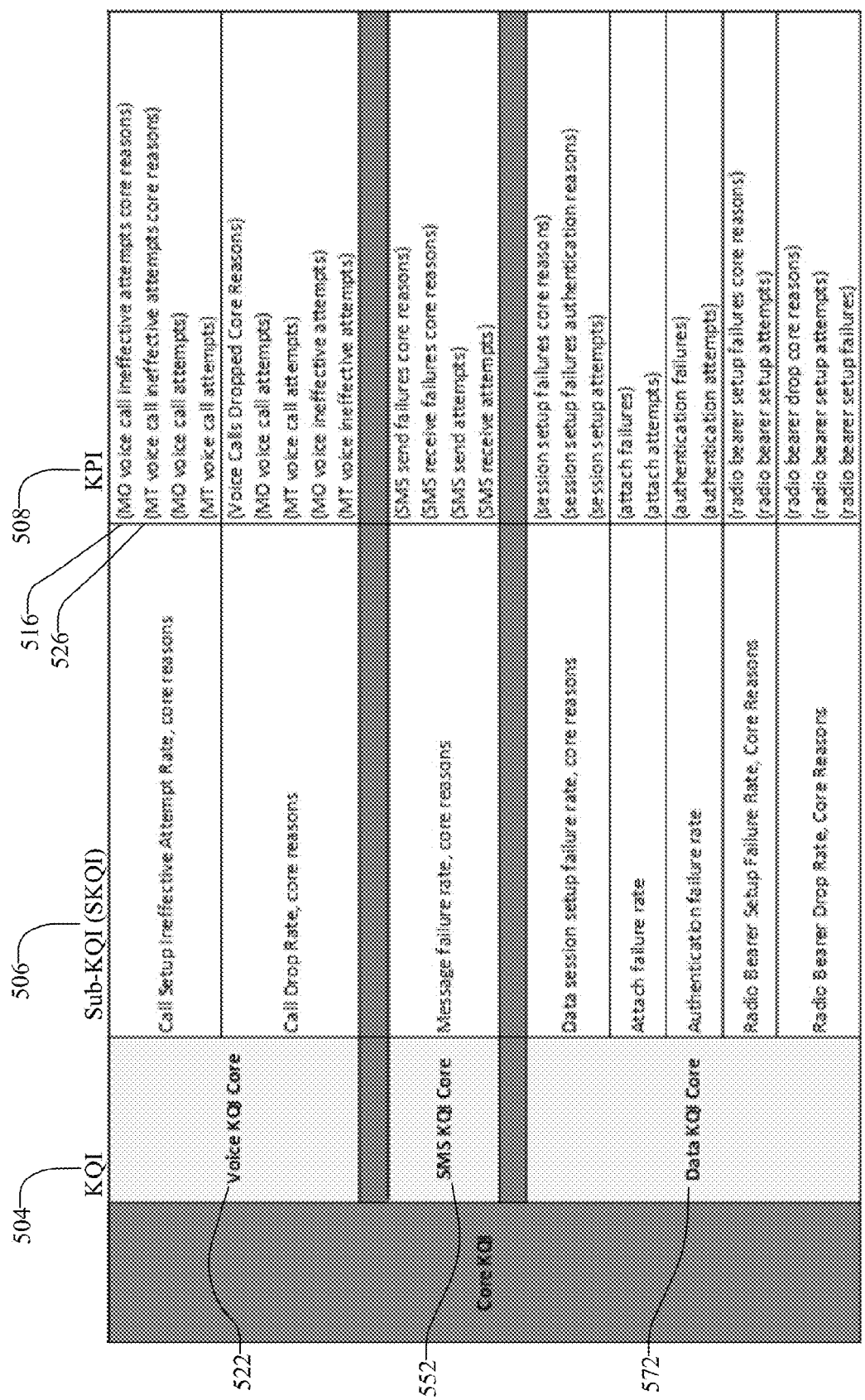
FIG. 5 shows a list of KPI rates and KPIs utilized for calculating voice KQIs, SMS KQIs and data KQIs for core networks.

FIG. 5 shows a list of core network KPIs 508 and SKQIs 506 utilized for calculating KQIs 504 for voice 522, SMS 552 and data 572. Voice-related KPIs include both mobile originated (MO) 516 and mobile terminated (MT) 526 voice call ineffective attempts for core reasons. Other core-related KPIs also show failures for core reasons.

Figure 6:
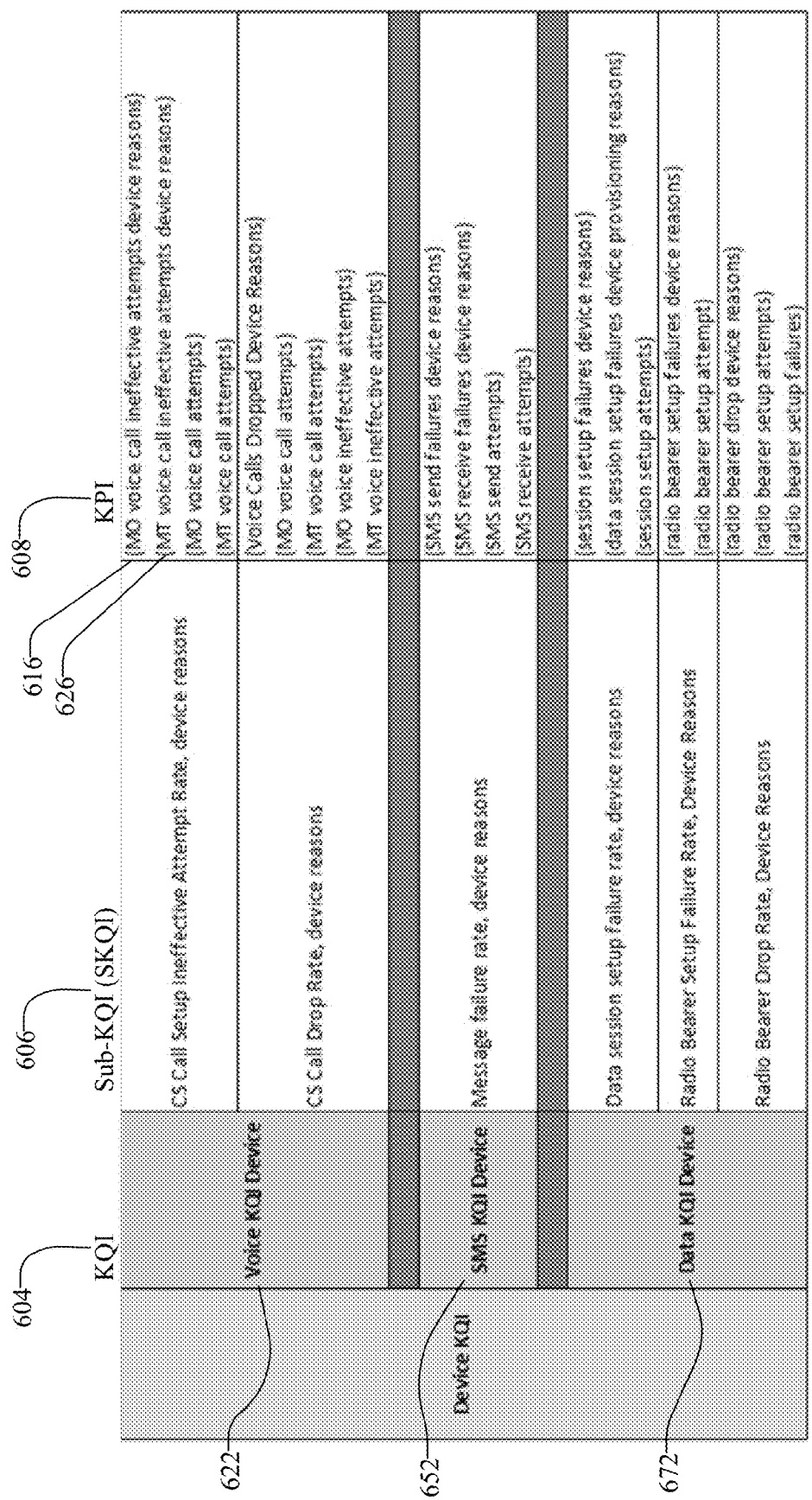
FIG. 6 shows KPI rates and KPIs for calculating voice KQIs, SMS KQIs and data KQIs for cellular devices.

For cellular devices, FIG. 6 shows a list of device-level KPIs 608 and SKQIs 606 utilized for calculating KQIs 604 for voice 622, SMS 652 and data 672. Device-related KPIs include mobile originated (MO) 616 and mobile terminated (MT) 626 "voice call ineffective attempts for device reasons", as well as other device-related KPIs.

Figure 7:
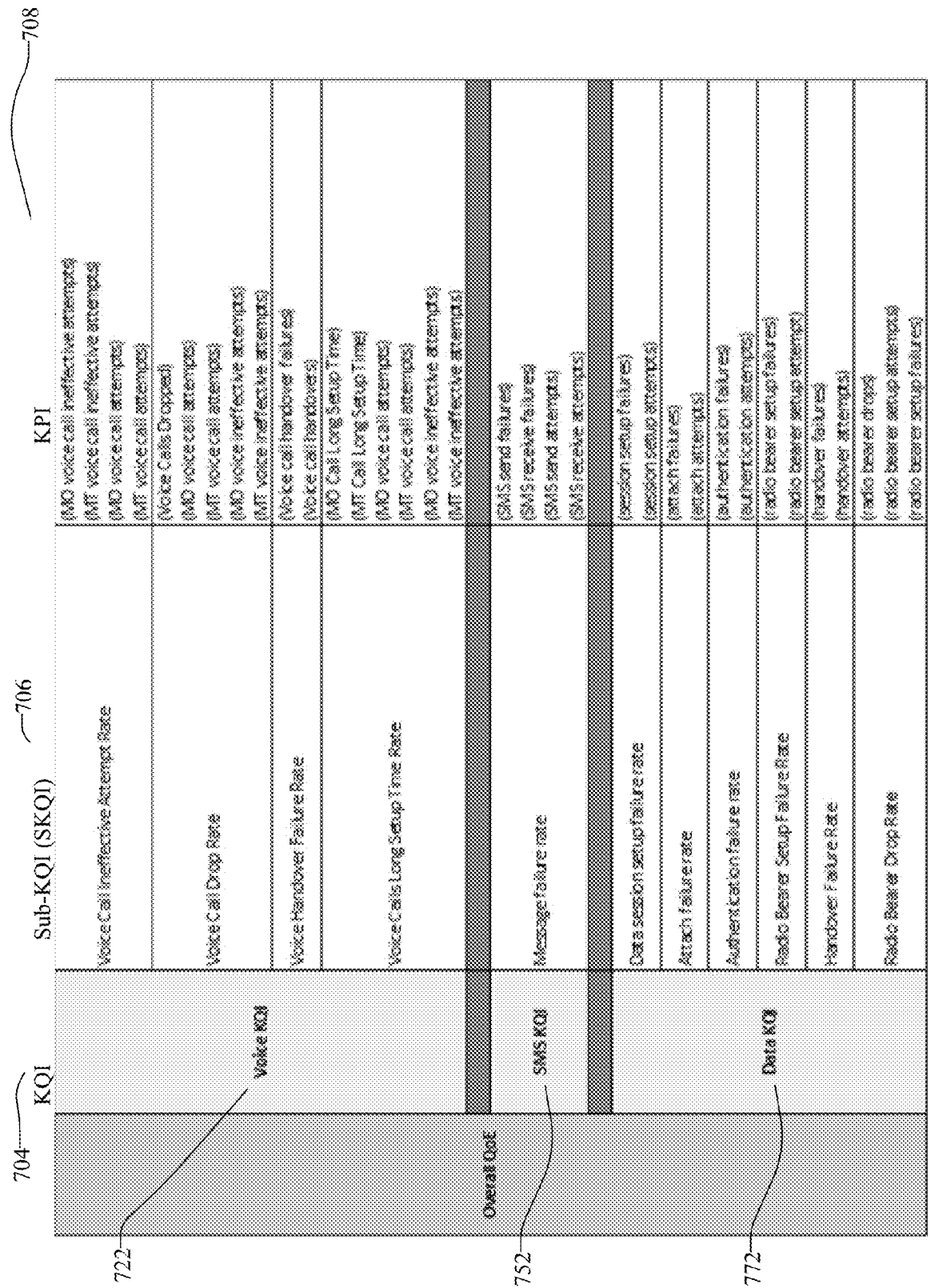
FIG. 7 summarizes a combination of KPIs and KQIs utilized for calculating a quality of experience (QoE).

A subscriber's overall QoE calculation takes into account voice, SMS, data and VoLTE, if applicable. Sub-KQIs (SKQIs) map into the KQIs for voice, SMS, data and sometimes VoLTE. FIG. 7 summarizes a combination of KPIs 708, SKQIs 706 and KQIs 704 utilized for calculating the QoE: voice KQI 722, SMS KQI 752 and data KQI 772.

The disclosed technology includes SKQI scores calculated as a function of failure rate, in which a lower failure rate maps to a higher score which is good, and a higher failure rate maps to a lower score which is bad. In one implementation, the QoE has a default value range of one through five, in which five is good and one is bad. The range of QoE values can be customized. In one example, if a subscriber has twenty call attempts in a day and the ineffective call attempt threshold is set to 30%, and the score ranges from one to five, zero call failures would result in a score of five; six or more call failures would result in a score of one.

An overall QoE score takes into account the weighted average of all the SKQI scores. Each SKQI has a minimum and a maximum weight, with higher weights assigned to the more important SKQIs. Weight is a relative value, used to communicate the relative importance to other KPIs and the relative importance to other service types. SKQI weight is a function of the failure rate and volume. SKQI with high failure rates are amplified to highlight abnormal issues. Weight is a function of record volume ratio and failure rate ratio, bounded by the minimum and maximum weights. Record volume ratio is the ratio of the record volume to a preset volume threshold.

Figure 8:
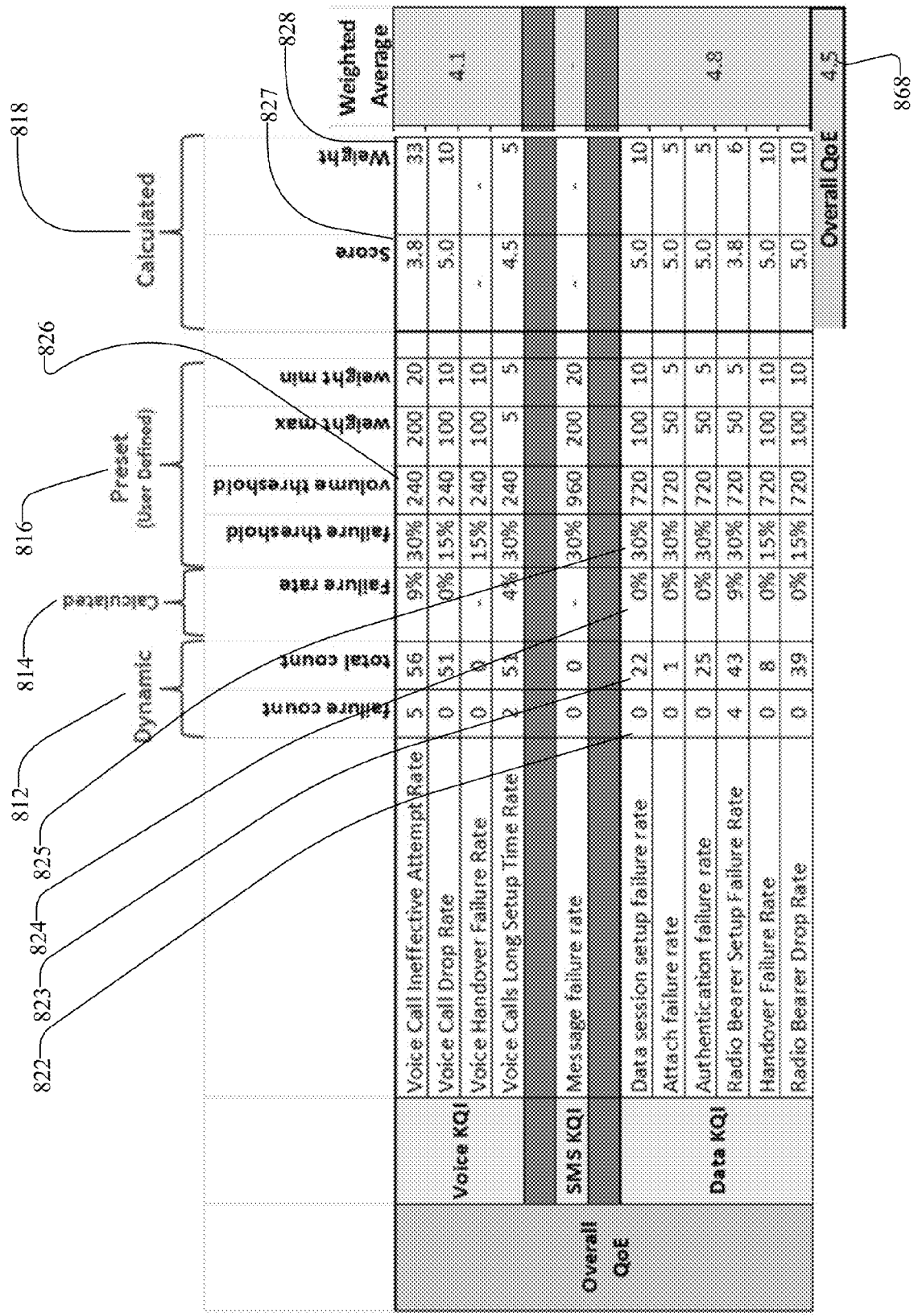
FIG. 8 shows KQI and weight calculations for an example scenario whose data results in a calculated overall high QoE.

FIG. 8 shows KQI scores and weight calculations for an example scenario whose data results in a calculated overall high QoE. Daily failure threshold, volume threshold, weight maximum and weight minimum are preset 816 for voice, SMS and data. The daily failure threshold is preset to thirty percent 825 and the volume threshold is preset, in the example, to two-hundred forty 826. The failure count and total count of calls are dynamic 812. The QoE calculation for this example data is described next. For a daily call volume of fifty-six calls 823, with a failure count of five 822, the failure rate is calculated as 5/56 which is nine percent 824. The failure rate ratio is the ratio of the calculated failure rate 814 to the preset failure rate threshold 825, which results in a failure rate ratio of nine percent divided by thirty percent, which is approximately thirty percent. Taking into account the preset min/max weight of 20/200 yields a calculated weight of thirty-three 828. The weighted average for voice KQI is calculated by multiplying the calculated score 827 by the calculated weight 828, adding the products for the four elements together, and dividing by the sum of the weights. In the example of FIG. 8 the weighted average for voice KQI calculation: (3.8×33+5.0×10+4.5×5)/(33+10+5)=4.1. A similar calculation is completed for data KQI. The weighted averages are then averaged to obtain the overall QoE value of 4.5 868. When there is no data for a KPI 834, no weight 838 is applied and the KPI does not affect the weighted average.

FIG. 9 shows the KQI and weight calculations, this time applied to an example scenario whose data results in a calculated overall low QoE. In this scenario, the overall QoE is 2.1 958. Note that a weight of zero 926 is assigned when there is no activity; that is, when the total for a KPI is zero 924.

Figure 10A:
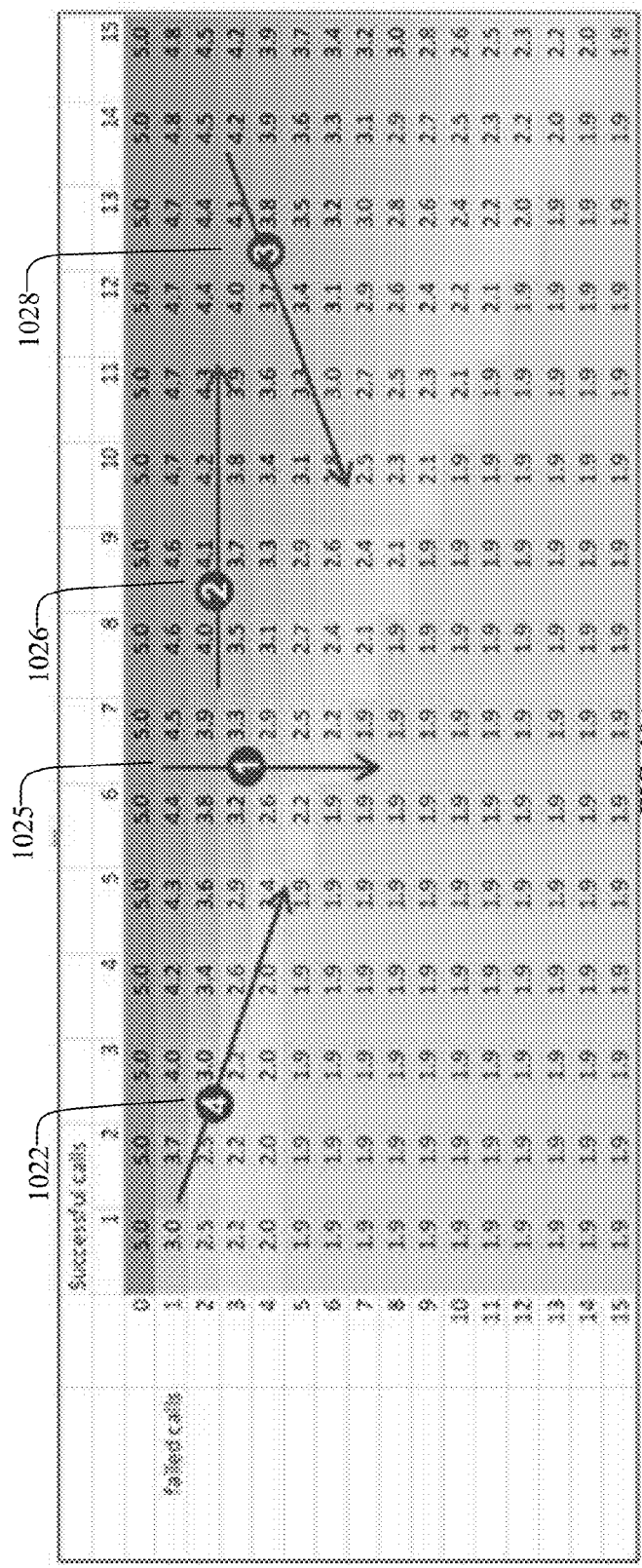
FIG. 10A shows a graphical representation of the relationship between successful call volumes, failed call volumes and QoE scores.

FIG. 10A shows a graphical representation of the relationship between successful call volumes, failed call volumes and QoE scores. In the graph, the number of successful calls increases from left to right and the number of failed calls increases from top to bottom. The red circles with numbers correspond to the numbers shown outside the graph and included in the following description. As shown in the graph, for a constant successful call volume, additional failed calls gradually decrease the overall QoE score 1025. For a constant failed call volume, additional successful calls gradually increase the overall QoE score 1026. For a constant total call volume of successful and failed calls, a higher failure ratio results in a lower QoE score 1028. At a constant failure ratio, an increased call volume has a higher assigned weight 1022.

The key quality indicators listed in FIG. 4, FIG. 5, FIG. 6 and FIG. 7 are calculated using the formulas listed next.

$$VoLTE\ KQI = \frac{\Sigma(Score_{VoLTE\ KPIs} \times Weight_{VoLTE\ KPIs})}{\Sigma Weight_{VoLTE\ KPIs}}$$

$$Voice\ KQI = \frac{\Sigma(Score_{Voice\ KPIs} \times Weight_{Voice\ KPIs})}{\Sigma Weight_{Voice\ KPIs}}$$

$$Data\ KQI = \frac{\Sigma(Score_{Data\ KPIs} \times Weight_{Data\ KPIs})}{\Sigma Weight_{Data\ KPIs}}$$

$$SMS\ KQI = \frac{\Sigma(Score_{SMS\ KPIs} \times Weight_{SMS\ KPIs})}{\Sigma Weight_{SMS\ KPIs}}$$

The calculation for the quality of experience (QoE) utilizes the KQI calculations as shown in the QoE formula listed next.

$$QoE = \frac{\begin{array}{l}\Sigma(Score_{Voice\ KPIs} \times Weight_{Voice\ KPIs})+\\ \Sigma(Score_{VoLTE\ KPIs} \times Weight_{VoLTE\ KPIs})+\\ \Sigma(Score_{SMS\ KPIs} \times Weight_{SMS\ KPIs})+\\ \Sigma(Score_{Data\ KPIs} \times Weight_{Data\ KPIs})\end{array}}{\begin{array}{l}\Sigma(Weight_{Voice\ KPIs} + Weight_{VoLTE\ KPIs} +\\ Weight_{SMS\ KPIs} + Weight_{Data\ KPIs})\end{array}}$$

The analytics component of the model supports subscriber-level QoE and impact analysis based on data models that incorporate both active tests and passive subscriber and network data sources.

This disclosed technology enhances the application of the QoE model by using the volume of impacted intervals over a time period as a predictor of subscriber experience. A higher count of impacted intervals represents a more significant unsatisfactory experience, and a lower count of impacted intervals may only represent an insignificant or un-noticed glitch in the overall experience. The model computes the scores and weights of a set of QoE contributors, considering the usage volume and the ratio of success versus failure transactions, which results in a set of scores and weights for each contributor.

Human perception of the quality of service for their communication is affected by the frequency with which disruptions are detected. When analyzing QoS obtained using the disclosed technology, the measurement of impacted hours or days for a subscriber coordinates well with survey results for the subscriber. That is, if a subscriber experienced more than some number x of hours of bad experience, they may report the problem in a subscriber satisfaction survey. In one example, a subscriber is more likely to have an adverse reaction when disruptions happen with regular frequency, than if the service is faulty or unavailable for some particular incident.

In one example, the QoS measure can be provided to a CRM call center, enabling customized service to subscribers experiencing communication network problems. In one example, call-ins by disgruntled subscribers can be pre-empted by texting or emailing the impacted subscribers to acknowledge network problems before call-ins occur. This early identification of potential issues can also lead to the identification of micro-outages that could lead to serious network communication issues, if not rectified. In another example, QoS measurements above a configurable threshold for a subscriber can be mapped to a manager that can trigger an alarm and can be displayed via subscriber alerts ad CRM background 178 on UI 188. In another use case, a customer that provides network services can use patterns in the QoE indexes for individual subscribers for planning network improvements and engineering changes, to predict churn and to verify success of their communications network. In yet another use case, configurable rules can be triggered based on the value of a calculated QoE index.

Figure 10B:
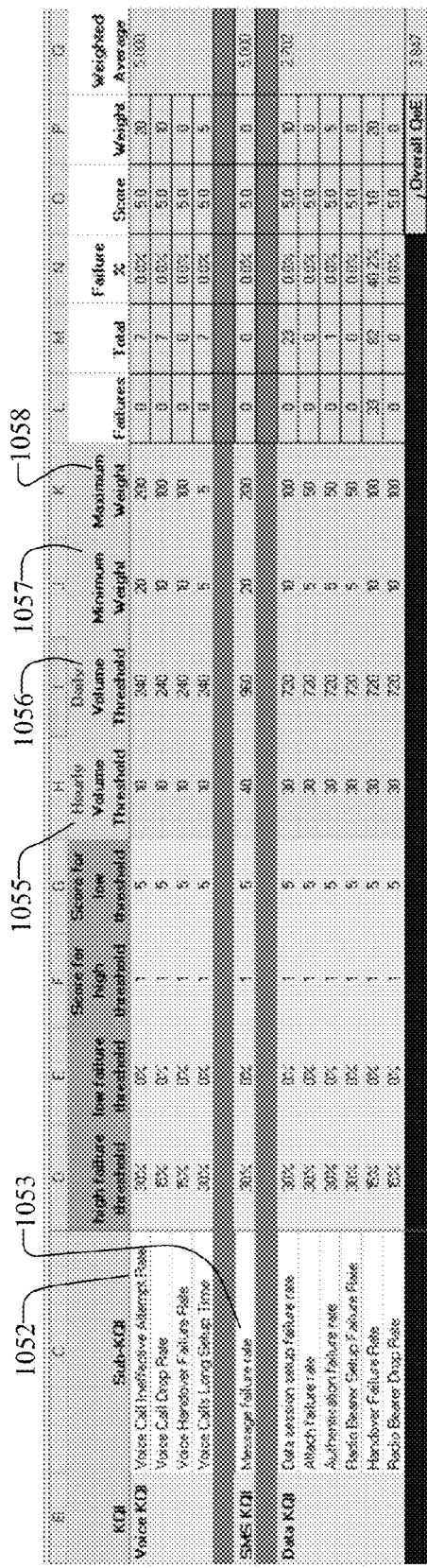
FIG. 10B shows an example set of calculations of the weighted averages for SKQIs that aggregate to an individual's KQIs for voice, SMS and data.

Adaptive weighting can be calculated using a configurable failure threshold and a configurable volume threshold, and the adapted weights can be applied to the quality sub-indicators for the individual in the second time windows, and calculating KQIs that are aggregates of SKQI scores which are each a function of failure rate, with a lower failure rate mapping to a higher score and a higher failure rate mapping to a lower score, as described supra. FIG. 10B shows an example table of calculations of the weighted averages for SKQIs that aggregate to an individual's KQIs for voice, SMS and data. Intelligent threshold calculator 138 calculates adaptive thresholds to individual subscribers' data, using hourly volume thresholds 1055 and daily volume thresholds 1056 for calculating the SKQIs.

The adaptive weight can be represented using pseudo code as:
If total number of failures=0, then the adaptive weight=0, else
=minimum weight+(maximum weight−minimum weight)*
(If (total number of failures/daily volume threshold)>1, then*1, else
=total number of failures/daily volume threshold)*
(If (failure percentage/high failure threshold)>1, then*1, else*
failure percentage/high failure threshold)

In the example shown in FIG. 10B, the KQIs each have a default value range of one through five, in which five is good and one is bad. Each SKQI has a minimum weight 1057 and a maximum weight 1058, with higher weights assigned to the more important SKQI, such as voice call ineffective attempt rate 1052 and SMS failure rate 1053. The overall QoE 1086 takes into account the weighted average of all the KQI scores. The calculation of the adaptive weight, shown in the example of FIG. 10B and listed in column P row 25 1059, is described here in words. If the daily volume total is zero, then the weight is zero. If the daily volume total is greater than zero and greater than the daily volume threshold and the failure percentage is greater than the high failure threshold, then the weight is equal to the minimum weight preset by the operator plus the maximum weight minus the minimum weight. If the daily volume total is greater than zero and less than the daily volume threshold, and the failure percentage is greater than the high failure threshold, the weight is equal to the minimum weight plus, the maximum weight minus the minimum weight times the daily volume total divided by the daily volume threshold. If the daily volume total is greater than zero and greater than the daily volume threshold and the failure percentage is less than the high failure threshold, then the weight is equal to the minimum weight preset by the operator plus, the maximum weight minus the minimum weight times the failure percentage divided by the high failure threshold. If the daily volume total is greater than zero and less than the daily volume threshold, and the failure percentage is greater than the high failure threshold, the weight is equal to the minimum weight plus the maximum weight minus the minimum weight, times the daily volume total divided by the daily volume threshold, times the failure percentage divided by the high failure threshold.

Figure 11:
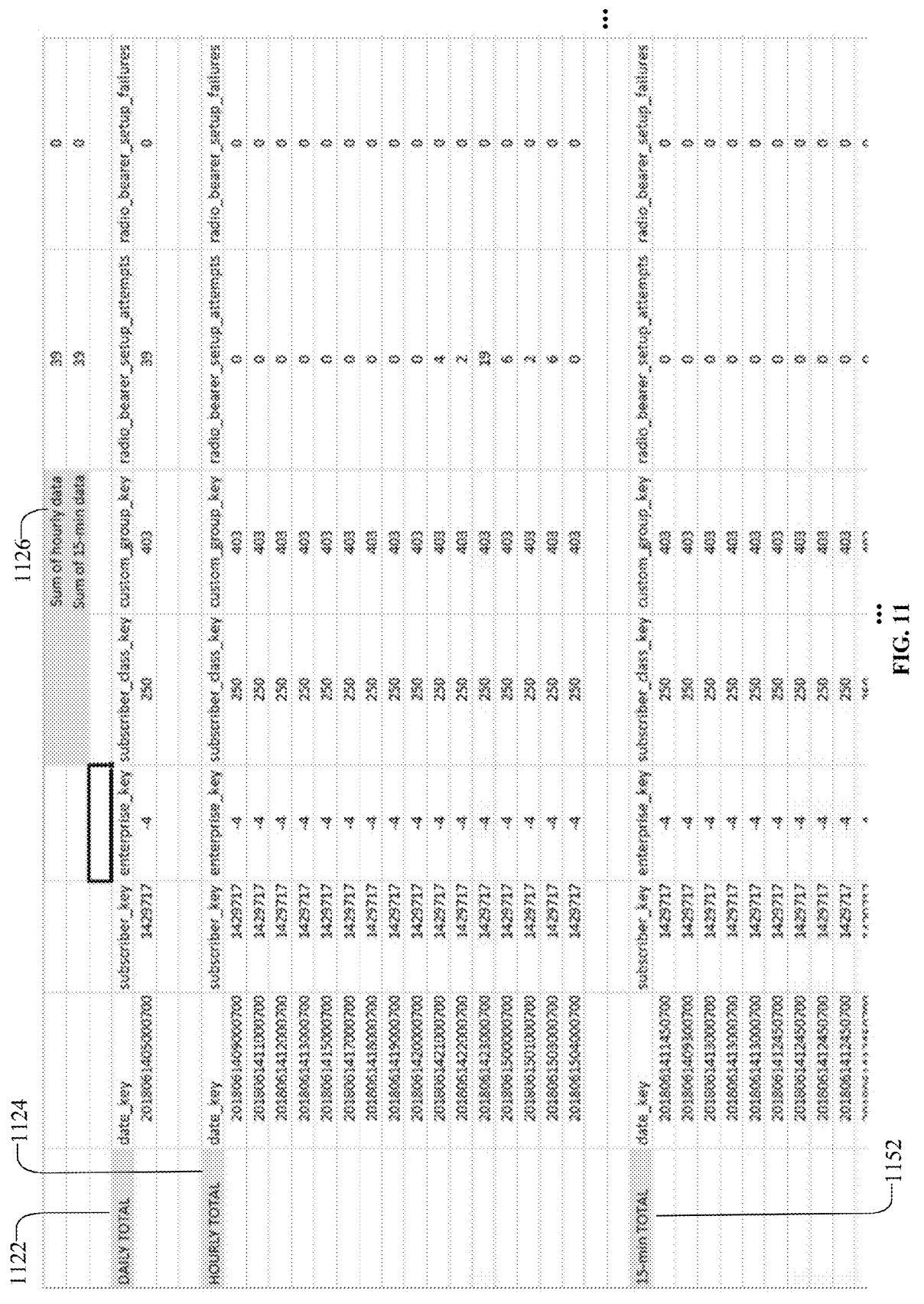

FIG. 11 shows a snippet of a KPI data table for time intervals 214, with a snapshot of part of the data for 15 minute time windows 1152, for an individual subscriber that time aggregator 136 rolls up into hourly aggregation tables 206, as an hourly total 1124 rolled into a second time window. In this example, the first time window is fifteen minutes long. Twenty-four hourly totals roll up into daily aggregation tables 238 for KPIs. In one example, hourly QoE graphs tend to reflect more discontinuities due to usage gaps during the day, even while effectively highlighting specific issues experienced by the subscriber.

Figure 13A:
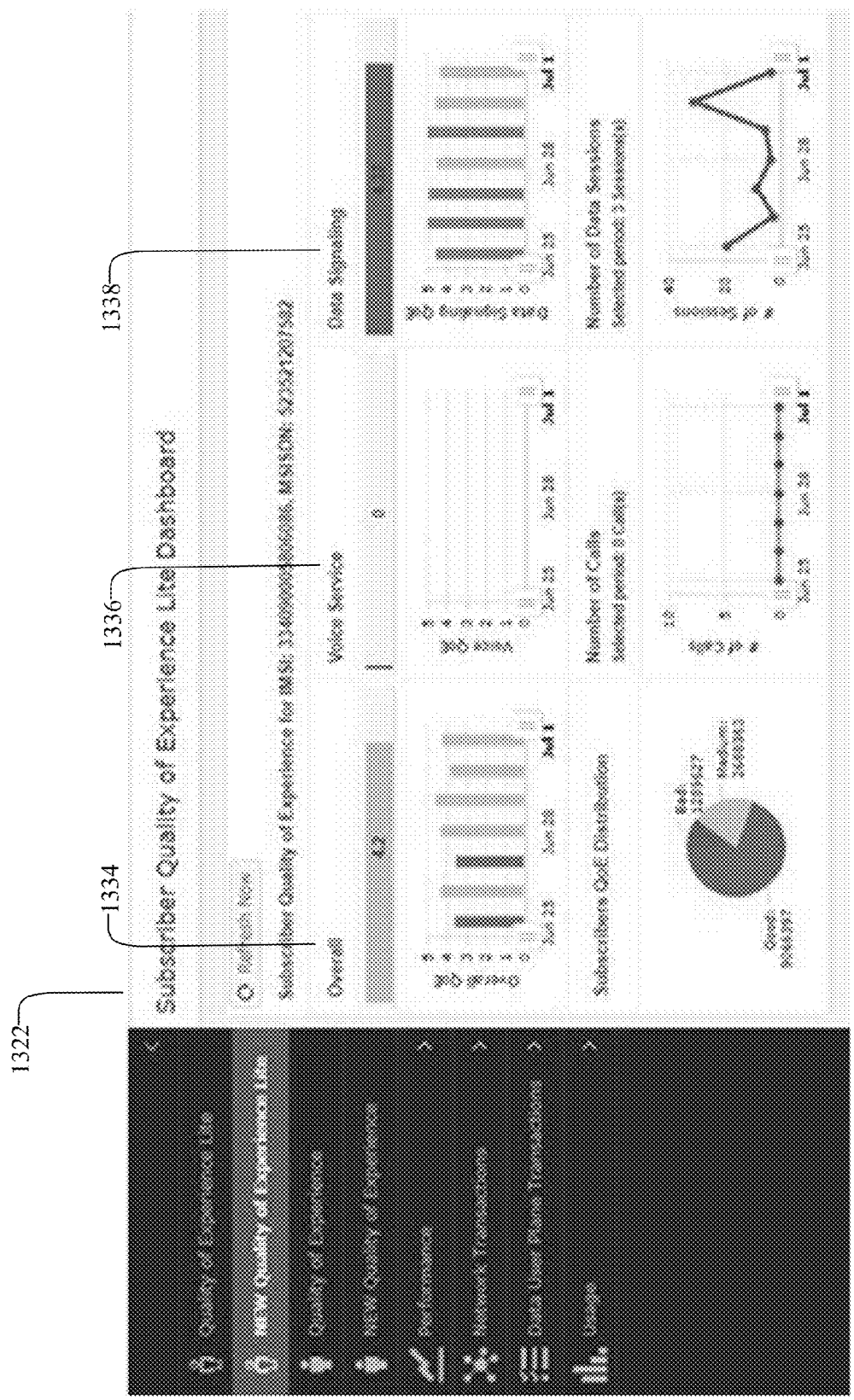
FIG. 13A shows an example subscriber quality of experience dashboard of scores suitable for drilldown from key quality indicators to details of individual users' experiences.
Figure 13B:
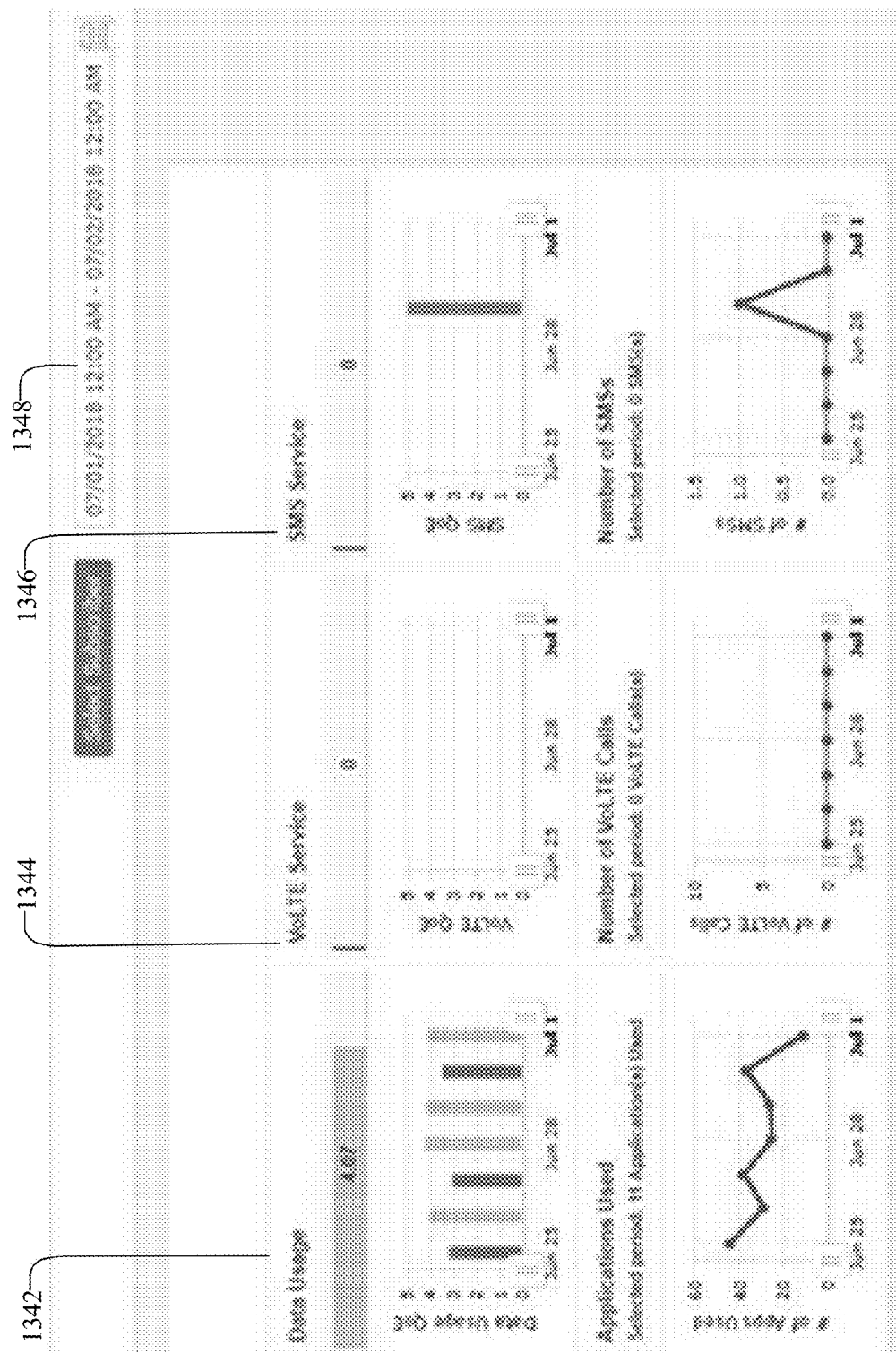
FIG. 13B shows dashboard graphs for data usage, VoLTE service and SMS service for the same example subscriber for a 24 hour window.

FIG. 13A shows an example subscriber quality of experience dashboard 1322 of scores suitable for drilldown from key quality indicators to details of the individual users' experiences, with an overall QoE 1334, as well as separate voice service 1336, data signaling 1338, for three data sessions. In this example the data is represented in three windows of two days each. In another example, the data can be shown in hourly time windows, or in weekly time windows, or another time window size configured by an operator. FIG. 13B shows dashboard graphs for data usage 1342, VoLTE service 1344 and SMS service 1346 for the same example subscriber for 24 hour windows 1348.

Figure 14:
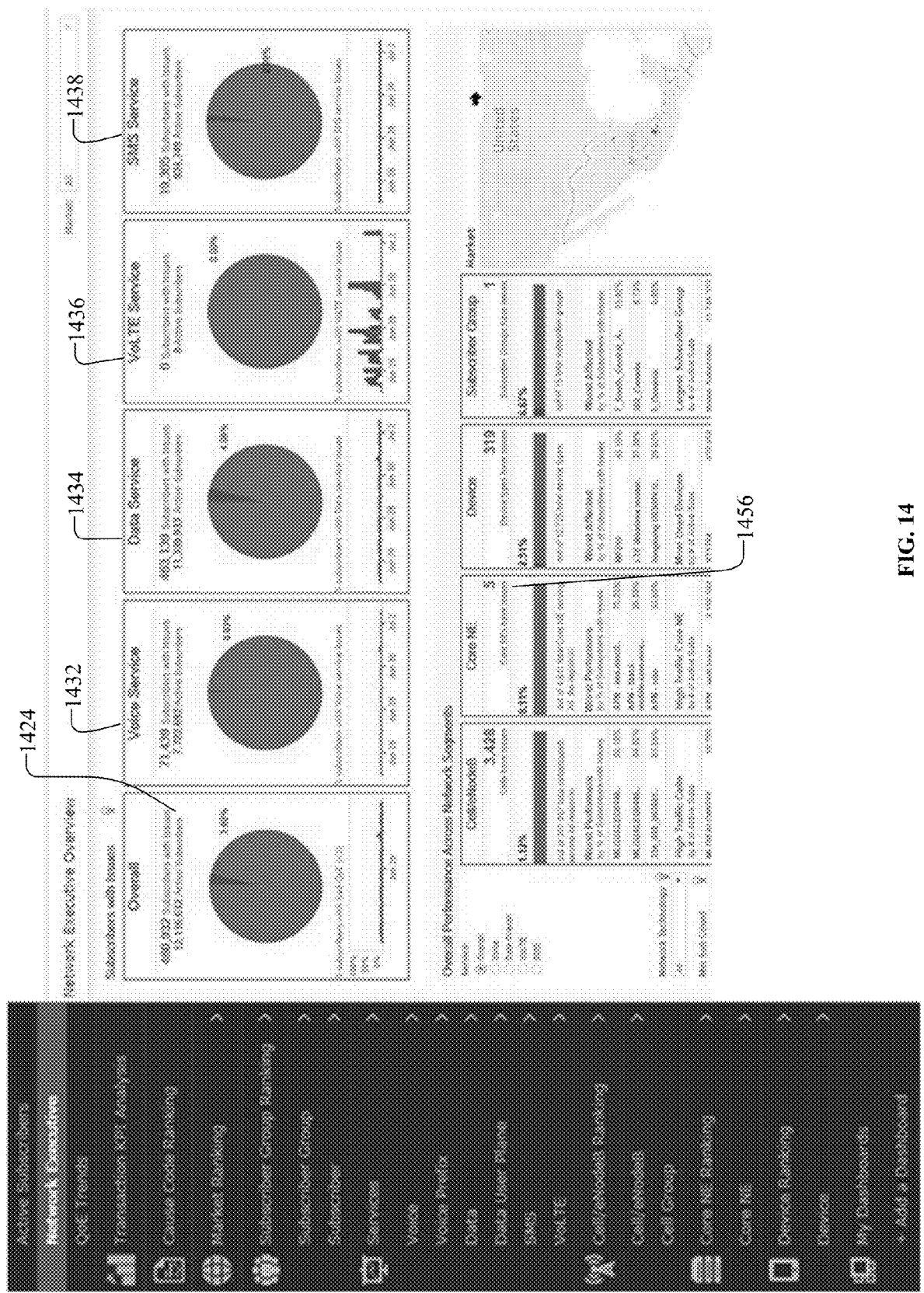
FIG. 14 shows an example quality of experience dashboard of scores for millions of users in a cohort and identifies impacted core network components based on shared user experiences of the users in the cohort.

FIG. 14 shows an example quality of experience dashboard 1422 of scores for millions of users 1424 in a cohort and identifies impacted core network components 1456 from shared user experiences of the users in the cohort. Data for subscribers in the cohort with issues are separately reported for voice service 1432, data service 1434, VoLTE service 1436 and SMS service 1438 in one example dashboard. Additional dashboard user interface displays, not shown, can include drilldown details for individual users and for cohorts of users. Overall performance across network segments for cohorts of users can also be included in the QoE dashboards, for tracking performance.

The disclosed technology for alerting a network operator to deteriorated wireless network conditions with granularity and reduced false alerts utilizes time-stamped data received over a time period. An interval is stabilized when all or almost all of the data needed for a calculation has been received. An interval stabilization algorithm is usable to determine when a data interval is stabilized. In one use case, a configurable waiting period is utilized prior to calculating adaptive thresholds and storing the data in the database. In one example, the waiting period is twenty minutes. If additional data that would apply to the calculation arrives outside the waiting period—for example two hours later, the calculation can be changed, in one use case, or ignored in another case.

Impacted time slice QoS counts can be used to address both individual subscriber relationships and network diagnostics. Given network diversity and time varying usage, normal behavior needs to be benchmarked to identify what is changing.

Intelligent Thresholding

The disclosed technology applies intelligent thresholding to the complicated quality of service (QoS) measure of impacted time slice counts, thresholding values against a configurable interval—taking in a data count, which is a simple object containing an integer count, and the metadata about that count such as time interval, and references to other objects associated with it. The threshold function dynamically builds a model of a KPI and generates alerts when that KPI deviates from its normal behavior—using the information in the data count structure to establish the context around the count, including the mean and variance of the model, the current severity and the current activity level.

Intelligent thresholding uses the time history of the parameters and adjusts the threshold, based on that history.

The disclosed system learns the threshold by looking at the past values of the measurement.

The disclosed system can be configured to apply intelligent thresholding to almost any KPI that can be generated from the data being collected, for dealing with noisy measurements, transient outliers and missing and late data. In addition to commonly collected network performance KPIs, the system can also be used to monitor data collection volume, for instance, to enable alerts if the data collection system itself experiences issues. The system can also be configured to alert based on unusual user activity of the system or abnormal load of the various servers used by the system.

The disclosed technology includes intelligent thresholding that builds a model of a KPI—in one example, based on a weekly cycle of values. In one example, a new mean is calculated for a KPI by utilizing the mean, calculated for the day of the week and time of the day for a week earlier, along with the new value of the KPI for the current day of the week and time of the day that matches that time and day for the previous week. In other words, for a granular focus of interest such as a physical focus on a tower or focus on an account related to a single user experience, the disclosed technology includes accessing a weekly KQI profile of means and variances and comparing the current KQIs in a time window to past KQIs in a similar time window in the weekly KQI profile. For each time interval, the system computes a weighted average of the mean and standard deviation of the KPI, for that time interval. As new observation measurements are computed for the KPI, the system updates the model via a weighted average of the previous value and the new observation.

$$NewMean=(1-\alpha)\times OldMean+\alpha\times NewMeasure$$

$$NewVar=(1-\beta)\times OldVar+\beta\times NewDev$$

In addition to the model of the KPI, the system continually computes a severity. The severity of the KPI measurement quantifies the deviation from the mean of that KPI, in terms of the expected standard deviation. The severity is a weighted average of recent values, unlike the model mean and standard deviation, which are weighted averages of previous measurements from the same time period, for example, the same time one week prior. For example, a severity of 3.0 implies that the observed KPI value is 3.0 standard deviations away from the expected mean of that KPI. Like the data model itself, the severity is updated as a weighted average of the new measured severity, and the most recently calculated severity.

$$NewSeverity=(1-\gamma)\times OldSeverity+\gamma\times NewDiff$$

The system uses the severity value to determine if the observed KPI value is significantly different than expected. The weighted average mechanism assures that the system doesn't over-react to a single, unusual measurement. If the KPI value remains outside its expected range for several time intervals, the severity value for that KPI will exceed a configurable threshold. In one use case the default threshold is set to 3.5 standard deviations away from the mean. The system can be configured to generate an alert when this severity threshold is exceeded. The disclosed intelligent thresholding functionality utilizes the severity value to avoid alerts for one-off conditions that return to normal in the next measurement time period.

Figure 15:
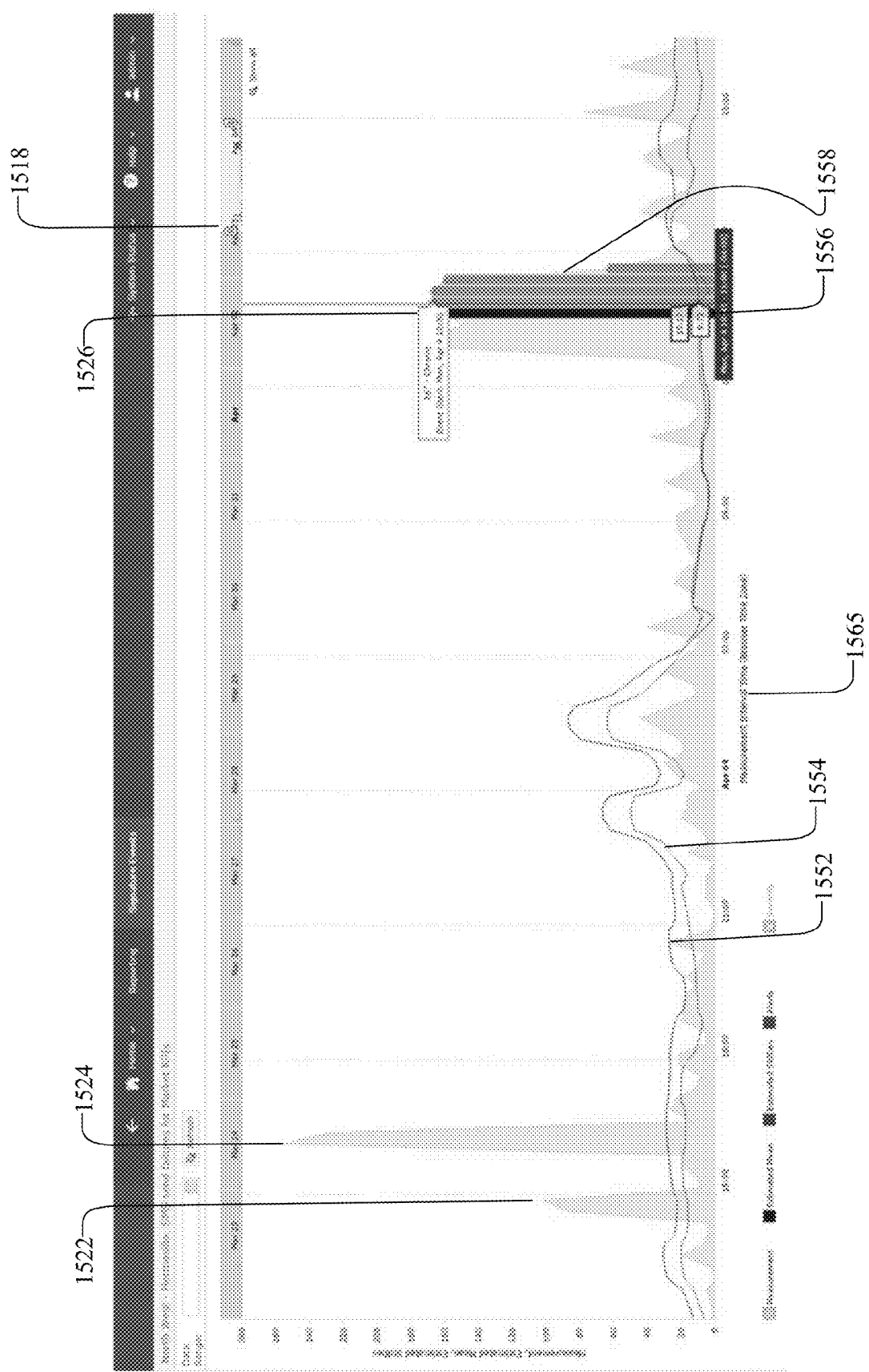
FIG. 15 shows an example QoS measurement chart with mean, standard deviation and alerts graphed over a measurement time interval, for alerting a network operator to deteriorated wireless network conditions with granularity and reduced false alerts.

FIG. 15 shows an example QoS measurement chart with mean, standard deviation and alerts graphed over a measurement time interval 1565, displayed for the browser time zone, usable for alerting a network operator to deteriorated wireless network conditions with granularity and reduced false alerts. The chart in FIG. 15 shows data for April 4, from 15:00 hours and extending for twenty-four hours. Sliders 1518 in the user interface can be adjusted to zoom in on specific dates. The chart shows critical conditions 1556 and chronic conditions 1558 that are ongoing, as well as one-off conditions 1522, 1524 that return to normal in the next measurement period. The graphs of the estimated mean 1552, in blue, and the estimated standard deviation 1554, in green, reflect the intelligent thresholding calculations based on measurements, described supra. The event started at 9:30 pm and is characterized as chronic event 1526 at 10:30 pm on April 4 and causes an alert to be generated, because a critical condition extends over multiple full fifteen minute measurement time intervals. Each gold bar represents a 15-minute time slice. The condition continues to be ongoing until the measurement drops below the configurable alert threshold.

The disclosed system employs special processing to deal with outlier measurements, missing data, and data arriving out of order. Outlier measurements are determined when the observed KPI is outside the range of expected mean plus a number of standard deviations. The system treats these measurements as if they were closer to the mean, to avoid overreacting to measurements which may not be truly representative. In one implementation, the disclosed technology includes handling out-of-range performance indicators that are more than four standard deviations from a mean value for the KQI by substituting values that are in a range of three to four standard deviations from the mean value.

When the system detects that measurements are missing for a KPI, the intelligent thresholding includes adaptation with anomaly detection, taking into account time of day, such as rush hour and other periodic problems. The threshold can be dynamically adapted, with special handling of missing data, and using a mechanism to determine when to wait to see if late data arrives, versus declaring that data is missing and continuing with updating the severity calculation. When the data modelling logic encounters a missing data point, the missing data can be handled using different policies for calculating the severity for a missing data point. In one case, missing data can be reset to zero, which is a historical, classic approach. Another policy for handling missing data can be to use the expected mean to calculate the severity, as if the system had received a measured value equal to the expected mean. A third distinct policy for handling missing data is to copy forward the previous interval's severity. Yet another policy is to use the expected variance to create a random draw from the configured distribution type when the disclosed data modelling logic encounters a missing data point. The random draw is then passed through the model generation algorithm as if it was the measured value. Missing data does not generate threshold violation alerts, but can be configured to generate missing data alerts, in one implementation. Entire missing intervals, aka empty intervals, can be reported via a different alert type, using a different error code. For one user interface, missing data can be shown on the chart on the zero line, with a bubble and tooltip indicating that it was missing, and the calculations can be performed as described supra.

In one use case, the intelligent thresholding system needs time to establish the base model with mean and standard deviation for each KPI. For system initialization, the system can be configured to wait for N cycles, where N is configurable, before determining whether or not the model for a KPI is stable and therefore whether to generate alerts if the severity exceeds the threshold value. In one example, for a system based on weekly cycles of KPI measurements, the system can be configured to suppress alerts for three full cycles.

Continuing with the description of special processing, if no records are received in the fact data for a particular element, or if there is a record but its value is null and the system is not configured to convert nulls to zeros, then its associated monitored properties will consider it to be missing. One implementation converts nulls to zeros. In another implementation, nulls are handled as missing data. One of the following four scenarios occurs, depending on the input fact data. In a first scenario, rows exist in the fact data for a particular element, and the measurement expression, such as sum, avg, min, max, yields a non-null value normal data point. In a second scenario, rows exists in the fact data for a particular element, and the measurement expression, such as sum, avg, min, max, yields a null value and the system is configured to convert nulls to zeros yielding a normal data point with a value of 0.0. In a third scenario, rows exist in the fact data for a particular element and the measurement expression, such as sum, avg, min, max, yields a null value and the system is not configured to convert nulls to zeros, or rows do not exist in the fact data for a particular element but the interval stabilized, both resulting in a missing data point which can be handled as described supra. In the fourth scenario, no rows were received in the fact data for that interval at all because the measurement never stabilized, resulting in a missing interval.

Further continuing with the description of special processing, data outliers that are out of the range of expected fact data can be handled by setting data samples to the three-sigma level or four-sigma level. In one implementation, a weekly data model utilizes fifteen-minute intervals and data collected over the past week, waits forty-eight hours to ensure that a full set of data has been collected, and substitutes last average value data in place of data anomalies such as unexpected zero measurements. In one example, an outlier value of one hundred can be scaled to ten, after applying the three-sigma rule to the anomalous data. Bursts of data into the input data queue are normal for mobile communications networks so special handling is not required to accommodate this behavior.

Figure 16:
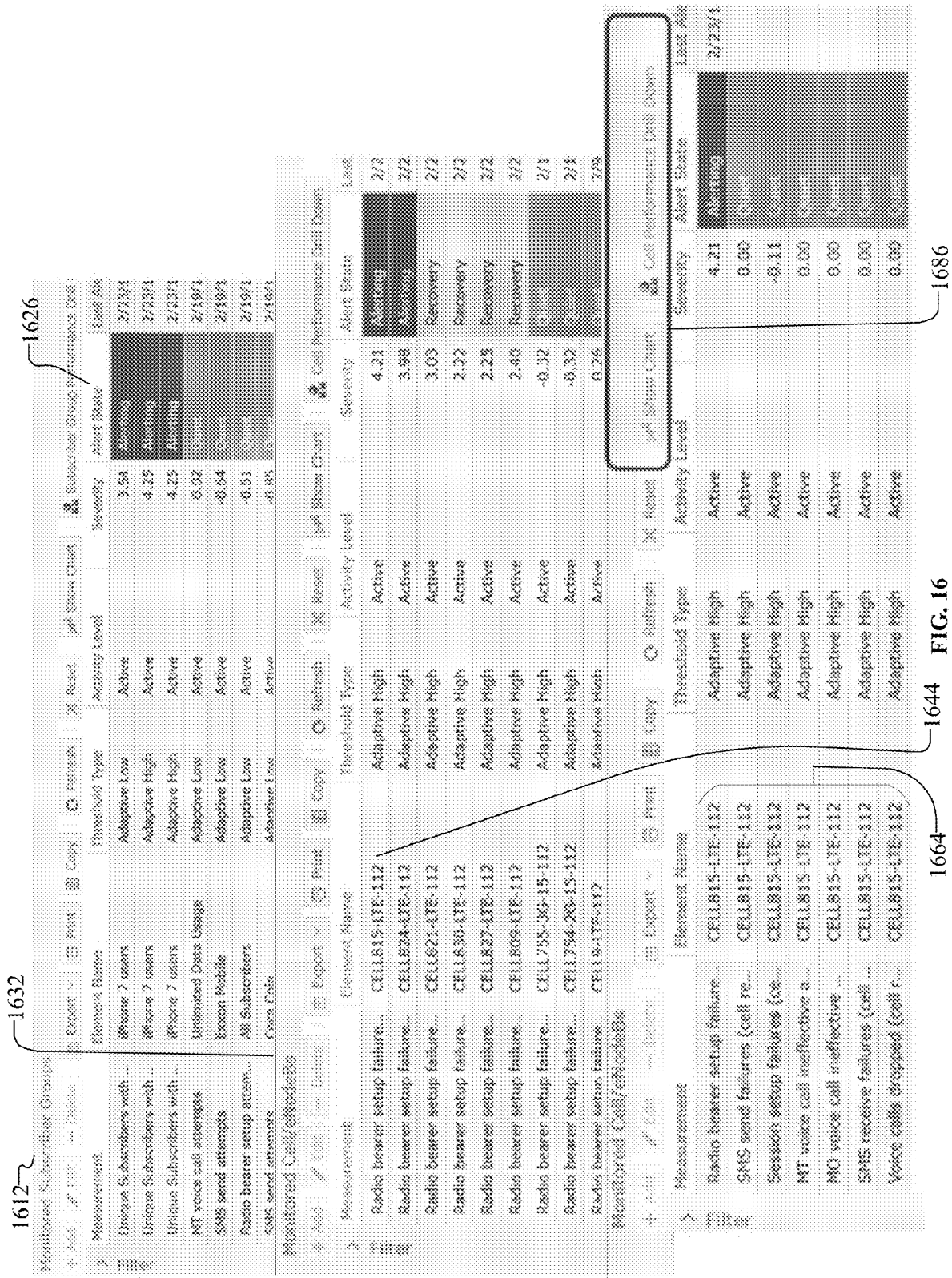
FIG. 16 shows excerpts from an example user interface that reports QoE measurements and an alert state for monitored subscriber groups, for monitored cell/eNodeBs.

FIG. 16 shows excerpts from an example user interface that reports QoE measurements and an alert state 1626 for monitored subscriber groups 1612, for monitored cell/eNodeBs 1632. FIG. 16 also shows a popup dialog 1686 suitable for drilldown from key quality indicators to details of an individual user's experiences. In this example, data for a specific cell 1644 is shown in the drilldown window 1664 in the bottom portion of FIG. 16.

Next we describe a computer system usable to evaluate the customer service experience for individuals and for cohorts of users of data communication services in a wireless communications network.

Computer System

Figure 12:
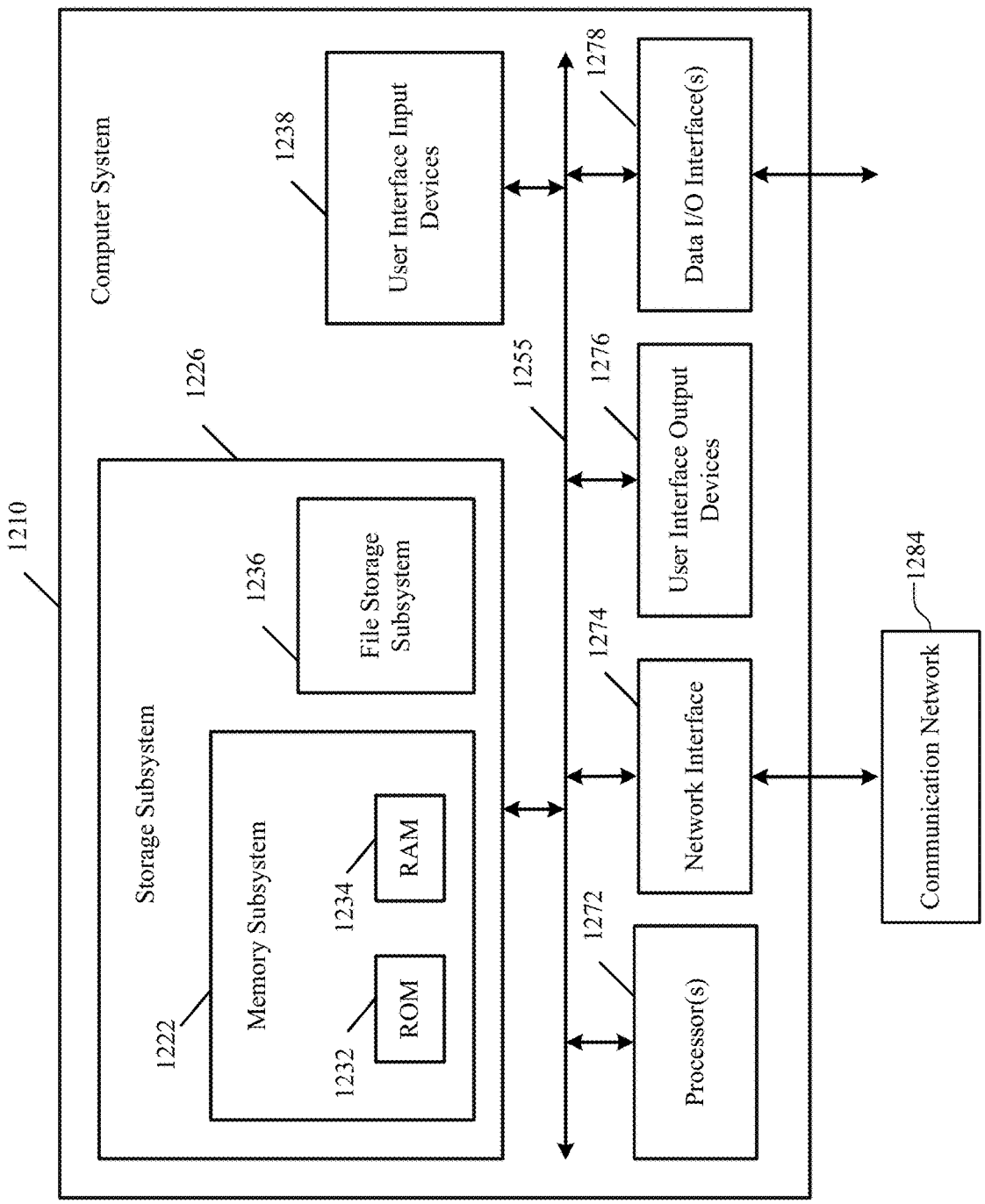
FIG. 12 depicts a block diagram of an exemplary system for alerting a network operator to deteriorated wireless network conditions with granularity and reduced false alerts, according to one implementation of the technology disclosed.

FIG. 12 is a simplified block diagram of a computer system 1210 that can be used for alerting a network operator to deteriorated wireless network conditions with granularity and reduced false alerts, according to one implementation of the technology disclosed.

Computer system 1200 includes at least one central processing unit (CPU) 1272 that communicates with a number of peripheral devices via bus subsystem 1255. These peripheral devices can include a storage subsystem 1226 including, for example, memory devices and a file storage subsystem 1236, user interface input devices 1238, user interface output devices 1276, and a network interface subsystem 1274. The input and output devices allow user interaction with computer system 1200. Network interface subsystem 1274 provides an interface to a communication network 1284, and to corresponding interface devices in other computer systems.

In one implementation, the network towers of FIG. 1 can be communicably linked to the storage subsystem 1226 and the user interface input devices 1238. User interface input devices 1238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1200.

User interface output devices 1276 can include a display subsystem, a printer, a fax machine, or non-visual displays such as audio output devices. The display subsystem can include an LED display, a flat-panel device such as a liquid crystal display (LCD), a projection device, a cathode ray tube (CRT), or some other mechanism for creating a visible image. The display subsystem can also provide a non-visual display such as audio output devices. In general, use of the term "output device" is intended to include all possible types of devices and ways to output information from computer system 1200 to the user or to another machine or computer system.

Storage subsystem 1226 stores programming and data constructs that provide the functionality of some or all of the modules and methods described herein.

Memory subsystem 1222 used in the storage subsystem 1210 can include a number of memories including a main random access memory (RAM) 1232 for storage of instructions and data during program execution and a read only memory (ROM) 1234 in which fixed instructions are stored. A file storage subsystem 1236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1236 in the memory subsystem 1222, or in other machines accessible by the processor.

Bus subsystem 1255 provides a mechanism for letting the various components and subsystems of computer system 1200 communicate with each other as intended. Although bus subsystem 1255 is shown schematically as a single bus, alternative implementations of the bus subsystem can use multiple busses.

Computer system 1200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1200 depicted in FIG. 12 is intended only as a specific example for purposes of illustrating the preferred embodiments of the present invention. Many other configurations of computer system 1200 are possible having more or less components than the computer system depicted in FIG. 12.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed method for alerting a network operator to deteriorated wireless network conditions with granularity and reduced false alerts includes receiving tracked performance indicators for multiple components of at least voice, data and messaging over a cellular network. The method includes accessing a mapping of the performance indicators to key quality indicators (KQI). Performance indicators are also referred to as key performance indicators (KPI) in some implementations. The disclosed method also includes combining the performance indicators, according to the mapping, into quality sub-indicators for individual users and into key quality indicators for the individual users. Sub-indicators are referred to as sub KQIs in some implementations. The disclosed method further includes smoothing the current key quality indicator measures of performance over time to reduce impact of brief transitory events and accessing a weekly KQI profile of key quality indicators. Also, the method includes comparing KQIs for a current time window to past KQIs for a corresponding time window in the weekly KQI profile for the individual users operating mobile devices in part of the cellular network that is a focus of interest. Based on the comparing, the disclosed method includes generating alerts that report out-of-range current KQIs [means] within the focus of interest that are persistently out-of-range longer than a configurable time. Out-of-range for a current KQI refers to a KQI value that is beyond a mean value plus a configurable variance (standard deviation) from the mean for the KQI value, in one implementation. The range of values allowed within which a value is not designated as an out-of-range current KQI can be configurable in some implementations. Out-of-range values represent situations which outside a range in which the mobile network functions effectively, in one implementation.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For some implementations of the disclosed method, thousands to millions of users in a cohort are within the focus of interest. In another case, at least hundreds of users using a particular cell tower are the focus of interest.

For some implementations, the disclosed method includes monitoring of the individual users, including counting instances for each individual user in which the KQIs are out of range for longer than a predetermined time, and in some cases contacting the user when the counted instances exceed a configurable limit. For one implementation, monitoring can be ongoing. In another implementation, monitoring can be set up as periodic monitoring of single users, and counting instances for a single user in which the KQIs are out of range for longer than the predetermined time. In one case, when the counted instances exceed a configurable limit, a network operator can configure the system to send an alert to customer relations with alternative contact options, optionally with a recommended option, and responding to an option selection by initiating the contacting the user. Another option can include sending customer relations alternative resolution options, optionally with a severity escalation but no individualized action, and responding to an option selection.

One implementation of the disclosed method includes receiving separately tracked performance indicators for voice communications, short message service (abbreviated SMS) and data service experienced by the individual user, and in some cases can also include VoIP service. Some implementations include accessing a mapping of the performance indicators that include a mapping through intermediate quality sub-indicators (abbreviated SKQI) to key quality indicators.

One implementation of the disclosed method includes monitoring of cell tower transmission areas as the focus of interest, detecting decreased successful activity within a cell tower transmission area reflected by the KQIs, and generating an alert when the decreased successful activity level is persistently out-of-range for longer than a configurable predetermined time. As used herein, out-of-range refers to KQI values that represent a limit beyond which the wireless network conditions are at least sub-optimal, are in some cases not useful, and in other cases not usable. In some scenarios, values that represent an out-of-range activity level can be configured by a network operator. In one example case, for holidays and other extraordinary time windows, an override can be applied to compare the current KQIs in a time window to the override of the weekly KQI profile; for dates such as December 25 and to Thanksgiving Day in the US. Another option for handling such dates is to exclude those dates from the KQI calculations, and using means and variances from the previous week instead.

Some implementations of the disclosed method include the weekly KQI profile reflecting an average between corresponding time windows over at least two weeks. The average is the central value. For example, the average for a value representing the time window of 10 am-10:15 am on a Tuesday is calculated by adding the value representing that time window on one Tuesday to the value for the same time window on the following Tuesday, and the sum is divided by two.

Several implementations of the disclosed method include the weekly KQI profile handling missing performance indicators by substituting last average values for the missing performance indicators, and can include handling out-of-range performance indicators that are more than four standard deviations from a mean value for the KQI by substituting values that are in a range of three or more standard deviations from the mean value. In one implementation, the substitute values are in a range of three or four standard deviations from the mean value.

In another implementation, a disclosed system includes one or more processors coupled to memory, the memory loaded with computer instructions, when executed on the processors, implement actions of the disclosed method described supra.

In yet another implementation a disclosed tangible non-transitory computer readable storage media is impressed with computer program instructions that, when executed on a processor, implement the disclosed methods described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method for alerting a network operator to deteriorated wireless network conditions with granularity and reduced false alerts, including:
   receiving tracked performance indicators for multiple components of at least voice, data and messaging over a cellular network;
   accessing a mapping of the performance indicators to key quality indicators (KQI);
   combining the performance indicators, according to the mapping, into quality sub-indicators for individual users and into key quality indicators for the individual users;
   smoothing current KQI measures of performance over time to reduce impact of brief transitory events;
   accessing a KQI profile of key quality indicators;
   comparing KQIs for a current time window to past KQIs for a corresponding time window in the KQI profile for the individual users operating mobile devices in part of the cellular network that is a focus of interest;
   monitoring the individual users by counting instances for each individual user in which the KQIs are out of range for longer than a predetermined time; and
   based on the comparing, generating alerts that report out-of-range current KQIs within the focus of interest that are persistently out-of-range longer than a configurable time.

2. The method of claim 1, wherein thousands to millions of users in a cohort are within the focus of interest.

3. The method of claim 1, further including contacting the individual user when the counted instances exceed a configurable limit.

4. The method of claim 1, further including recording an alert for the individual user when the counted instances exceed a configurable limit.

5. The method of claim 1, wherein at least hundreds of users using a particular cell tower are the focus of interest.

6. The method of claim 1, further including accessing a mapping of the performance indicators that include a mapping through intermediate quality sub-indicators (SKQI) to KQIs.

7. The method of claim 1, further including
   monitoring of cell tower transmission areas as the focus of interest,
   detecting decreased successful activity level within a cell tower transmission area reflected by the KQIs, and
   generating an alert when the decreased successful activity level is persistently out-of-range for longer than a configurable predetermined time.

8. The method of claim 1, further including the KQI profile reflecting an average between corresponding time windows over at least two weeks.

9. The method of claim 1, further including the KQI profile reflecting handling missing performance indicators by substituting last average values for the missing performance indicators.

10. The method of claim 1, further including handling out-of-range performance indicators that are more than four standard deviations from a mean value for the KQI by substituting values that are in a range of three to four standard deviations from the mean value.

11. A tangible non-transitory computer readable storage media impressed with computer program instructions that, when executed, objectively evaluate customer service experience with data communication services in a wireless communications network, including:
   receiving tracked performance indicators for multiple components of at least voice, data and messaging over a cellular network;
   accessing a mapping of the performance indicators to key quality indicators (KQI);
   combining the performance indicators, according to the mapping, into quality sub-indicators for individual users and into KQIs for the individual users;
   smoothing current KQI measures of performance over time to reduce impact of brief transitory events;
   accessing a KQI profile of key quality indicators;
   comparing KQIs for a current time window to past KQIs for a corresponding time window in the KQI profile for the individual users operating mobile devices in part of the cellular network that is a focus of interest;
   monitoring the individual users by counting instances for each individual user in which the KQIs are out of range for longer than a predetermined time; and
   based on the comparing, generating alerts that report out-of-range current KQIs within the focus of interest that are persistently out-of-range longer than a configurable time.

12. The tangible non-transitory computer readable storage media of claim 11, wherein thousands to millions of users in a cohort are within the focus of interest.

13. The tangible non-transitory computer readable storage media of claim 11, further including contacting the individual user when the counted instances exceed a configurable limit.

14. The tangible non-transitory computer readable storage media of claim 11, further including recording an alert for the individual user when the counted instances exceed a configurable limit.

15. A system for alerting a network operator to deteriorated wireless network conditions with granularity and reduced false alerts includes one or more processors coupled to memory, the memory loaded with computer instructions, that when executed on the processors, implement:
   receiving tracked performance indicators for multiple components of at least voice, data and messaging over a cellular network;
   accessing a mapping of the performance indicators to key quality indicators (KQI);
   combining the performance indicators, according to the mapping, into quality sub-indicators for individual users and into key quality indicators for the individual users;
   smoothing current KQI measures of performance over time to reduce impact of brief transitory events;
   accessing a KQI profile of key quality indicators;
   comparing KQIs for a current time window to past KQIs for a corresponding time window in the KQI profile for the individual users operating mobile devices in part of the cellular network that is a focus of interest;

monitoring the individual users by counting instances for each individual user in which the KQIs are out of range for longer than a predetermined time; and based on the comparing, generating alerts that report out-of-range current KQIs within the focus of interest that are persistently out-of-range longer than a configurable time.

16. The system of claim 15, wherein at least hundreds of users using a particular cell tower are the focus of interest.

17. The system of claim 15, further including accessing a mapping of the performance indicators that include a mapping through intermediate quality sub-indicators (SKQI) to KQIs.

18. The system of claim 15, further including monitoring of cell tower transmission areas as the focus of interest, detecting decreased successful activity level within a cell tower transmission area reflected by the KQIs, and generating an alert when the decreased successful activity level is persistently out-of-range for longer than a configurable predetermined time.

\* \* \* \* \*